United States Patent
Li et al.

(10) Patent No.: US 11,399,392 B2
(45) Date of Patent: Jul. 26, 2022

(54) UPLINK TRANSMISSION METHOD BASED ON AN AUTONOMOUS TRANSMISSION PARAMETER, COMMUNICATION METHOD BASED ON MAXIMUM CHANNEL OCCUPANCY TIME, TERMINAL, BASED STATION AND STORAGE MEDIUM

(71) Applicant: ZTE CORPORATION, Shenzhen (CN)

(72) Inventors: Xincai Li, Shenzhen (CN); Yajun Zhao, Shenzhen (CN); Ling Yang, Shenzhen (CN); Hanqing Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 50 days.

(21) Appl. No.: 17/043,837

(22) PCT Filed: Mar. 8, 2019

(86) PCT No.: PCT/CN2019/077561
§ 371 (c)(1),
(2) Date: Sep. 30, 2020

(87) PCT Pub. No.: WO2019/192285
PCT Pub. Date: Oct. 10, 2019

(65) Prior Publication Data
US 2021/0100033 A1 Apr. 1, 2021

(30) Foreign Application Priority Data
Apr. 4, 2018 (CN) .......................... 201810300691.5

(51) Int. Cl.
*H04W 74/08* (2009.01)
*H04W 72/04* (2009.01)
(Continued)

(52) U.S. Cl.
CPC ... *H04W 74/0808* (2013.01); *H04W 72/0413* (2013.01); *H04W 72/0446* (2013.01);
(Continued)

(58) Field of Classification Search
CPC ......... H04W 74/0808; H04W 72/0413; H04W 72/0446; H04W 72/1268; H04W 74/004; H04W 74/006
See application file for complete search history.

(56) References Cited

U.S. PATENT DOCUMENTS

| 2017/0013565 A1* | 1/2017 | Pelletier | H04W 72/0473 |
| 2017/0230838 A1* | 8/2017 | Yerramalli | H04W 72/0453 |

(Continued)

FOREIGN PATENT DOCUMENTS

| CN | 106134228 A | 11/2016 |
| CN | 106507439 A | 3/2017 |

(Continued)

OTHER PUBLICATIONS

International Search Report Form PCT/ISA/210, and Written Opinion Form PCT/ISA/237, International Application No. PCT/CN2019/077561 pp. 1-7 International Filing Date Mar. 8, 2019, mailing date of search report dated May 24, 2019.
(Continued)

*Primary Examiner* — Jael M Ulysse
(74) *Attorney, Agent, or Firm* — George McGuire

(57) ABSTRACT

Provided are an uplink transmission and communication methods and devices, a base station, a terminal and a storage medium. In the provided uplink transmission method, a terminal determines at least one autonomous transmission parameter for uplink transmission, sends the at least one autonomous transmission parameter to a base station, and then send uplink data to the base station according to the at least one autonomous transmission parameter. After receiv-
(Continued)

ing the at least one autonomous transmission parameter sent by the terminal, the base station detects and receives, according to the at least one autonomous transmission parameter, data sent by the terminal. In this manner, the terminal can flexibly transmit data according to currently available transmission resources without having to passively and rigidly wait until the transmission resources satisfy the scheduling requirements of the base station before performing transmission.

20 Claims, 7 Drawing Sheets

(51) Int. Cl.
  *H04W 72/12* (2009.01)
  *H04W 74/00* (2009.01)
(52) U.S. Cl.
  CPC ..... *H04W 72/1268* (2013.01); *H04W 74/004* (2013.01); *H04W 74/006* (2013.01)

(56) References Cited

U.S. PATENT DOCUMENTS

| | | | |
|---|---|---|---|
| 2017/0339530 A1 | 11/2017 | Maaref | |
| 2018/0227936 A1* | 8/2018 | Yerramalli | H04L 5/0094 |
| 2019/0223215 A1* | 7/2019 | Tian | H04W 72/0446 |
| 2019/0230578 A1* | 7/2019 | Karaki | H04W 48/12 |
| 2019/0253219 A1* | 8/2019 | Fan | H04W 16/14 |
| 2019/0289614 A1 | 9/2019 | Li et al. | |
| 2019/0342037 A1* | 11/2019 | Karaki | H04L 1/188 |
| 2020/0037359 A1* | 1/2020 | Wang | H04W 74/0808 |

FOREIGN PATENT DOCUMENTS

| | | |
|---|---|---|
| CN | 106851822 A | 2/2018 |
| CN | 107734713 A | 2/2018 |
| CN | 107852746 A | 3/2018 |
| JP | 2017537558 A | 12/2017 |
| JP | 2019504574 A | 2/2019 |
| JP | 2020529794 A | 10/2020 |
| WO | 2017099860 A1 | 6/2017 |
| WO | 2017132985 A1 | 8/2017 |
| WO | 2019030237 A1 | 2/2019 |

OTHER PUBLICATIONS

Qualcomm Incorporated "Further Details on PHY Layer Options for LAA" R1-152791, 3GPP TSG RAN WG1 #81, May 25-29, 2015, Fukuoka Japan. pp. 1-7.
Huawei, HiSilicon "NR frame structure on unlicensed bands" R1-1801370, 3GPP TSG RAN WG1 Meeting #92, Feb. 26-Mar. 2, 2018, Athens Greece. pp. 1-8.
Japanese Office Action, pp. 1-5.
European Search Report PCT/CN2019/077561, pp. 1-15. dated Dec. 21, 2021.

* cited by examiner

UPLINK TRANSMISSION METHOD BASED ON AN AUTONOMOUS TRANSMISSION PARAMETER, COMMUNICATION METHOD BASED ON MAXIMUM CHANNEL OCCUPANCY TIME, TERMINAL, BASED STATION AND STORAGE MEDIUM

CROSS-REFERENCES TO RELATED APPLICATIONS

This is a National Stage Application, filed under 35 U.S.C. 371, of International Patent Application No. PCT/CN2019/077561, filed on Mar. 8, 2019, which is based on and claims priority to Chinese patent application No. 201810300691.5 filed on Apr. 4, 2018, disclosure of which is incorporated herein by reference in its entirety.

TECHNICAL FIELD

The present disclosure relates to the field of communications and, in particular, to uplink transmission and communication methods and devices, a base station, a terminal and a storage medium.

BACKGROUND

In New Radio (NR), uplink transmission includes two modes: a Supplementary Uplink (SUL) mode and a Grant-free mode, and the SUL mode is a scheduled uplink transmission mode and the grant-free mode is a scheduling-free uplink transmission mode. Autonomous Uplink (AUL) is introduced to grant-less uplink transmission for LTE. However, in general, the flexibility of existing uplink transmission schemes is poor, resulting in poor system transmission efficiency and underutilization of system resources. Thus, the performance of a communication system is underutilized and the user experience is affected.

Therefore, it is urgent to propose a new communication scheme to solve the preceding problems, to improve the system performance and to enhance the user experience of a terminal.

SUMMARY

In the uplink transmission and communication methods and devices, base station, terminal and storage medium of embodiments of the present disclosure, an uplink transmission scheme is provided to solve the problems of insufficient transmission flexibility and low system transmission efficiency in an existing grant-less uplink transmission scheme, and a communication scheme is provided to solve the problem in which system communication resources are underutilized and system performance is thus affected in an existing communication scheme.

To solve the preceding problems, an embodiment of the present disclosure provides an uplink transmission method. The uplink transmission method includes determining at least one autonomous transmission parameter for uplink transmission, where the at least one autonomous transmission parameter is configured to indicate detection and reception of current uplink transmission; sending the at least one autonomous transmission parameter to a base station; and sending uplink data to the base station according to the at least one autonomous transmission parameter.

Optionally, the at least one autonomous transmission parameter includes at least one of the actual subcarrier spacing (SCS) for at least one slot used in the current uplink transmission, the initial transmission symbol of the current uplink transmission, or coded block group transmission information (CBGTI) transmitted in the current uplink transmission.

Optionally, in condition that the at least one autonomous transmission parameter includes the actual SCS, the determining the actual SCS includes at least one of determining, according to the time when listen-before-talk (LBT) processing succeeds, the actual SCS for the first M slots used in the current uplink transmission, where M is an integer greater than 0; or determining, according to the end time of the MCOT of the current uplink transmission, the actual SCS for the last N slots used in the current uplink transmission, where N is an integer greater than 0.

Optionally, the action of determining the actual SCS according to the time when LBT processing succeeds is performed in at least one of the following manners: manner one: receiving a basic-spacing indication sent by the base station and adjusting, according to the time when LBT processing succeeds, a basic SCS specified by the basic-spacing indication to obtain the actual SCS; or manner two: selecting, from among at least two candidate SCSs specified by the base station, one candidate SCS as the actual SCS according to the time when LBT processing succeeds.

Optionally, the action of determining, according to the end time of the MCOT of the current uplink transmission, the actual SCS for the last N slots used in the current uplink transmission is performed in at least one of the following manners: manner one: receiving a basic-spacing indication sent by the base station and adjusting, according to the end time of the MCOT, a basic SCS specified by the basic-spacing indication to obtain the actual SCS; or manner two: selecting, from among at least two candidate SCSs specified by the base station, one candidate SCS as the actual SCS according to the end time of the MCOT.

Optionally, in condition that the at least one autonomous transmission parameter includes the initial transmission symbol, the determining the initial transmission symbol includes determining the initial transmission symbol according to the time when listen-before-talk (LBT) processing succeeds.

Optionally, determining the initial transmission symbol according to the time when LBT processing succeeds includes determining the Kth symbol after the time when LBT processing succeeds as the initial transmission symbol, where K is an integer greater than or equal to 1 and less than a preset threshold.

Optionally, K is 1, and the at least one autonomous transmission parameter further includes at least one of the end transmission symbol of the current uplink transmission or the time-domain length of the current uplink transmission.

Optionally, in condition that the at least one autonomous transmission parameter includes the CBGTI, the determining the CBGTI includes selecting at least one of current to-be-transmitted coded block groups and acquiring the CBGTI of the selected coded block group.

Optionally, the at least one autonomous transmission parameter further includes at least one of the hybrid automatic repeat request (HARQ) process number, the new data indication (NDI) or the redundancy version (RV) information of the current uplink transmission.

Optionally, before determining the at least one autonomous transmission parameter for the uplink transmission, the uplink transmission method further includes receiving a listen-before-talk (LBT) processing indication sent by the base station, where the LBT processing indication includes time-domain indication information, frequency-domain indication information and beam direction information for indicating at least two transmission resources; and performing LBT processing on at least one of the at least two transmission resources according to the LBT processing indication and selecting, from among transmission resources whose LBT processing is successful, at least one transmission resource for the current uplink transmission.

An embodiment of the present disclosure provides an uplink transmission method. The uplink transmission method includes receiving at least one autonomous transmission parameter sent by a terminal, where the at least one autonomous transmission parameter is determined by the terminal and configured to indicate detection and reception of current uplink transmission; and detecting and receiving, according to the at least one autonomous transmission parameter, uplink data sent by the terminal.

Optionally, before receiving the at least one autonomous transmission parameter sent by the terminal, the uplink transmission method further includes sending a listen-before-talk (LBT) processing indication to the terminal, where the LBT processing indication includes time-domain indication information, frequency-domain indication information and beam direction information for indicating at least two transmission resources.

Optionally, the time-domain indication information includes an uplink transmission period configured for the terminal; the time-domain indication information is configured to instruct the terminal to perform LBT processing immediately as long as to-be-transmitted uplink data is present in the uplink transmission period; or the time-domain indication information includes the uplink transmission period configured for the terminal and a time-slot opportunity indication for indicating whether autonomous uplink transmission is allowed in each slot in the uplink transmission period; the time-domain indication information is configured to instruct the terminal to perform LBT processing in a slot selected from within the uplink transmission period according to the time-slot opportunity indication in response to presence of the to-be-transmitted uplink data.

Optionally, the frequency-domain indication information includes at least one uplink transmission frequency band configured for the terminal and a frequency-band opportunity indication for indicating whether uplink autonomous transmission is allowed in the at least one uplink transmission frequency band; the frequency-domain indication information is configured to instruct the terminal to perform LBT processing at a frequency-domain position selected from within the at least one uplink transmission frequency band according to the frequency-band opportunity indication in response to presence of to-be-transmitted uplink data.

Optionally, the beam direction information is determined according to a spatial parameter in a channel sounding reference signal (SRS) resource configuration.

An embodiment of the present disclosure provides a communication method. The communication method includes performing listen-before-talk (LBT) processing with random backoff for target transmission resources when uplink transmission is required; determining maximum channel occupancy time (MCOT) obtained from the LBT processing; and sending multiplexing association information for the MCOT to a base station so that the base station controls, according to the multiplexing association information, a sharing-transmission end to multiplex the remaining time of the MCOT after the uplink transmission is completed.

Optionally, sending the multiplexing association information for the MCOT to the base station includes at least one of sending, to the base station, first information for indicating the end time of the MCOT, where the first information serves as the multiplexing association information; or sending, to the base station, type information for indicating LBT processing performed when the sharing-transmission end multiplexes the remaining time, where the type information serves as the multiplexing association information.

Optionally, the first information includes at least one of the number of at least one of slots or symbols currently remaining in the MCOT; or the position of feedback time in the MCOT, where the position of the feedback time is configured by the base station for the uplink transmission.

An embodiment of the present disclosure provides a communication method. The communication method includes receiving multiplexing association information sent by a first-transmission terminal for maximum channel occupancy time (MCOT), where the first-transmission terminal is configured to perform listen-before-talk (LBT) processing with random backoff for target transmission resources and initiate the MCOT; and after determining, according to the multiplexing association information, that the MCOT still has remaining time after uplink transmission of the first-transmission terminal is completed, controlling a sharing-transmission end to multiplex the remaining time.

Optionally, controlling the sharing-transmission end to multiplex the remaining time includes determining, for the sharing-transmission end, the type of listen-before-talk (LBT) processing required to be performed when the remaining time is multiplexed; and controlling the sharing-transmission end to perform transmission by using the remaining time after LBT processing on the type is performed for target transmission resources.

Optionally, determining, for the sharing-transmission end, the type of the LBT processing required to be performed when the remaining time is multiplexed includes determining, according to at least one of the multiplexing association information, information about a transmitting end and a receiving end, or a beam relationship, the type of the LBT processing required to be performed when the remaining time is multiplexed. The information about the transmitting end and the receiving end is configured to indicate whether data transmitted by the sharing-transmission end by using the remaining time is related to the first-transmission terminal. The beam relationship is between a beam direction used by the sharing-transmission end and a first-transmission beam direction of the first-transmission terminal. The first-transmission beam direction is used in the first uplink transmission after the first-transmission terminal initiates the MCOT.

Optionally, determining, according to the multiplexing association information, the type of the LBT processing required to be performed when the remaining time is multiplexed includes, in condition that the multiplexing association information includes type information for indicating the LBT processing performed when the sharing-transmission end multiplexes the remaining time, parsing the multiplexing association information to determine the type of the LBT processing specified by a terminal.

Optionally, determining, according to the information about the transmitting end and the receiving end, the type of the LBT processing required to be performed when the remaining time is multiplexed includes, in condition that the information about the transmitting end and the receiving end indicates that the data to be transmitted by the sharing-transmission end is related to the first-transmission terminal, determining that the sharing-transmission end requires to perform LBT processing without random backoff; and, in condition that the information about the transmitting end and the receiving end indicates that the data to be transmitted by the sharing-transmission end is not related to the first-transmission terminal, determining, according to the time difference Δt between the earliest transmission time of the sharing-transmission end and the first-transmission end time of the first-transmission terminal, the type of the LBT processing required to be performed. The earliest transmission time is the earliest time at which transmission is allowed after it is assumed that the sharing-transmission end performs type-1 LBT processing on the target transmission resources in the remaining time. The first-transmission end time is the end time of the first uplink transmission after the first-transmission terminal initiates the MCOT.

Optionally, determining, according to the time difference Δt between the earliest transmission time of the sharing-transmission end and the first-transmission end time of the first-transmission terminal, the type of the LBT processing required to be performed includes, in condition that the time difference Δt is less than or equal to a first time threshold, determining that the sharing-transmission end requires to perform the type-1 LBT processing; in condition that the time difference Δt is greater than the first time threshold and less than a second time threshold, determining that the sharing-transmission end requires to perform type-2 LBT processing; and, in condition that the time difference Δt is greater than the second time threshold, determining that the sharing-transmission end requires to perform the LBT processing with random backoff.

Optionally, determining, according to the beam relationship, the type of the LBT processing required to be performed when the remaining time is multiplexed includes, in condition that the beam direction used by the sharing-transmission end is the same as the first-transmission beam direction of the first-transmission terminal, determining that the sharing-transmission end requires to perform type-2 LBT processing; and, in condition that the beam direction used by the sharing-transmission end is different from the first-transmission beam direction of the first-transmission terminal, determining that the sharing-transmission end requires to perform the LBT processing with random backoff.

An embodiment of the present disclosure provides an uplink transmission device. The uplink transmission device includes a parameter determination unit configured to determine at least one autonomous transmission parameter for uplink transmission, where the at least one autonomous transmission parameter is configured to indicate detection and reception of current uplink transmission; a parameter sending unit configured to send the at least one autonomous transmission parameter to a base station; and a data sending unit configured to send uplink data to the base station according to the at least one autonomous transmission parameter.

Optionally, the at least one autonomous transmission parameter includes at least one of the actual subcarrier spacing (SCS) for at least one slot used in the current uplink transmission, the initial transmission symbol of the current uplink transmission, or the coded block group transmission information (CBGTI) of a coded block group transmitted in the current uplink transmission.

An embodiment of the present disclosure provides an uplink receiving device. The uplink receiving device includes a parameter receiving unit configured to receive at least one autonomous transmission parameter sent by a terminal, where the at least one autonomous transmission parameter is determined by the terminal and configured to indicate detection and reception of current uplink transmission; and a data receiving unit configured to detect and receive, according to the at least one autonomous transmission parameter, uplink data sent by the terminal.

An embodiment of the present disclosure provides a first communication device. The first communication device includes a listening unit configured to perform listen-before-talk (LBT) processing with random backoff for target transmission resources when uplink transmission is required; an occupancy time determination unit configured to determine the maximum channel occupancy time (MCOT) obtained from the LBT processing; and an information sending unit configured to send multiplexing association information for the MCOT to a base station so that the base station controls, according to the multiplexing association information, a sharing-transmission end to multiplex the remaining time of the MCOT after the uplink transmission is completed.

An embodiment of the present disclosure provides a second communication device. The second communication device includes an information receiving unit configured to receive multiplexing association information sent by a first-transmission terminal for maximum channel occupancy time (MCOT), where the first-transmission terminal is configured to perform listen-before-talk (LBT) processing with random backoff for target transmission resources and initiate the MCOT; and a multiplexing control unit configured to, after the multiplexing control unit determines, according to the multiplexing association information, that the MCOT still has remaining time after uplink transmission of the first-transmission terminal is completed, control the sharing-transmission end to multiplex the remaining time.

An embodiment of the present disclosure provides a terminal. The terminal includes a first processor, a first memory and a first communication bus.

The first communication bus is configured to implement connection and communication between the first processor and the first memory.

The first processor is configured to execute an uplink transmission program stored in the first memory to perform the steps of the first uplink transmission method of any one of the preceding embodiments; or the first processor is configured to execute a first communication program stored in the first memory to perform the steps of the communication method of any one of the preceding embodiments.

An embodiment of the present disclosure provides a base station. The base station includes a second processor, a second memory and a second communication bus.

The second communication bus is configured to implement connection and communication between the second processor and the second memory.

The second processor is configured to execute a second uplink transmission program stored in the second memory to perform the steps of the uplink transmission method of any one of the preceding embodiments; or the second processor is configured to execute a second communication program stored in the second memory to perform the steps of the communication method of any one of the preceding embodiments.

An embodiment of the present disclosure provides a storage medium. The storage medium stores at least one of a first uplink transmission program, a second uplink transmission program, a first communication program or a second communication program. The first uplink transmission program is executable by one or more processors so that the steps of the uplink transmission method of any one of the preceding embodiments are performable. The second uplink transmission program is executable by the one or more processors so that the steps of the uplink transmission method of any one of the preceding embodiments are performable. The first communication program is executable by the one or more processors so that the steps of the communication method of any one of the preceding embodiments are performable. The second communication program is executable by the one or more processors so that the steps of the communication method of any one of the preceding embodiments are performable.

The present disclosure has the beneficial effects below.

According to the uplink transmission and communication methods and devices, base station, terminal and storage medium of embodiments of the present disclosure, in view of the problems of poor flexibility and low efficiency of uplink transmission in the related art, in the provided uplink transmission scheme, a terminal determines at least one autonomous transmission parameter for uplink transmission, sends the at least one autonomous transmission parameter to a base station, and then send uplink data to the base station according to the at least one autonomous transmission parameter. After receiving the at least one autonomous transmission parameter sent by the terminal, the base station detects and receives, according to the at least one autonomous transmission parameter, data sent by the terminal. In this manner, the terminal can flexibly transmit data according to currently available transmission resources without having to passively and rigidly wait until the transmission resources satisfy the scheduling requirements of the base station before performing transmission, thereby greatly enhancing the transmission flexibility of the terminal and improving the transmission efficiency of the system and the utilization of transmission resources. In view of the problem in which system communication resources are underutilized and the underutilization causes a waste of resources and poor system performance in the related art, an embodiment of the present disclosure provides a communication scheme. In the communication scheme, a terminal, such as a first-transmission terminal, performs LBT processing with random backoff for target transmission resources when uplink transmission is required, determines the MCOT obtained from the LBT processing, and then sends multiplexing association information for the MCOT to a base station so that the base station determines, according to the multiplexing association information, whether the MCOT has remaining time. After determining that the MCOT has remaining time, the base station controls a sharing-transmission end to multiplex the remaining time of the MCOT. In this manner, the resources of the MCOT initiated by the first-transmission terminal can be fully utilized, thereby avoiding a waste of resources and facilitating the optimization of resource allocation.

Other features and corresponding beneficial effects of the present disclosure are set forth later in the description, and it is to be understood that at least some of the beneficial effects become apparent from the description of the present disclosure.

DETAILED DESCRIPTION

To make the objects, solutions and advantages of the present disclosure more apparent, a more detailed description is given below to illustrate embodiments of the present disclosure in conjunction with implementations and drawings. It is to be understood that the embodiments described herein are intended to explain the present disclosure and not to limit the present disclosure.

Embodiment One

Grant-free transmission (scheduling-free transmission) includes two modes. In one mode, a base station semi-statically configures, through a higher layer, all transmission parameters including time-frequency domain resources, Modulation and Coding Scheme (MCS), and transmission block size (TBS); a terminal determines, according to the transmission requirements of the terminal, whether data transmission is required, and in condition that data transmission is required, the terminal transmits data according to the configured transmission parameters. In the other mode, repeated sending of transmission parameters is added based on SPS, that is, parameters including time-frequency domain resources, Modulation and Coding Scheme (MCS), and transmission block size (TBS) are all indicated by the base station through the downlink control information of activated SPS.

Figure 1:
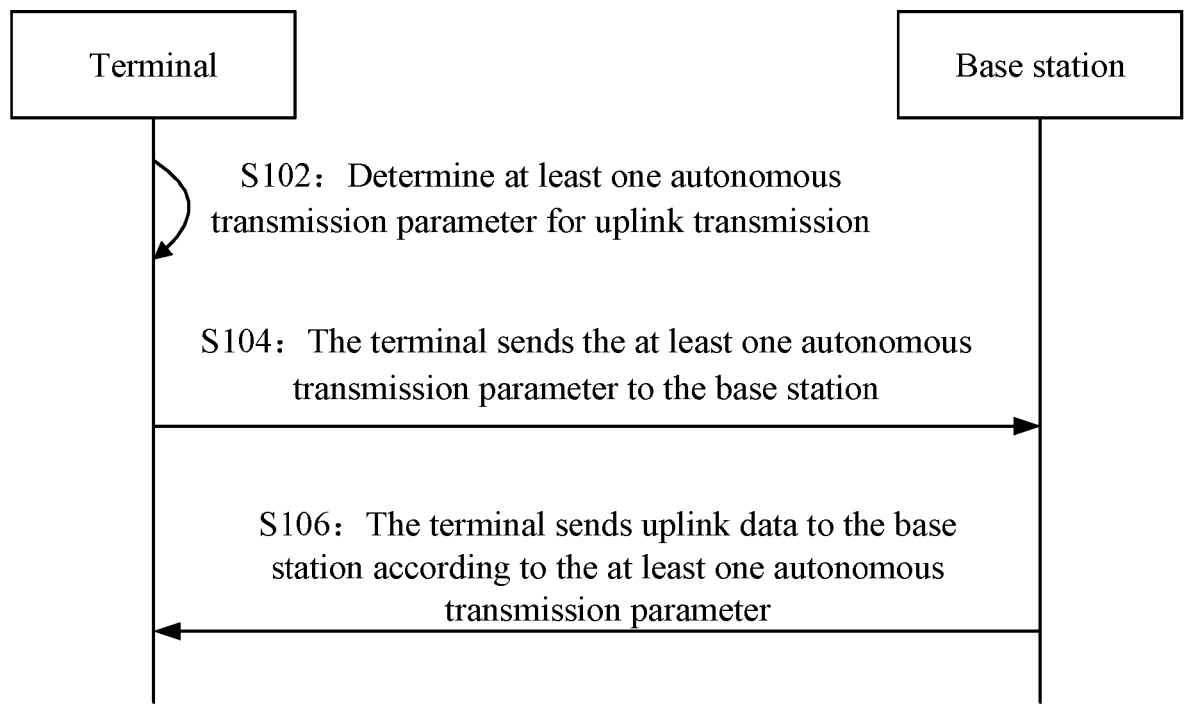
FIG. 1 is a flowchart of an uplink transmission method according to embodiment one of the present disclosure.

However, in the preceding uplink transmission scheme, uplink transmission of the terminal is still required to be performed completely according to the transmission parameters specified by the base station. In condition that the current transmission conditions do not satisfy the requirements of the transmission parameters configured by the base station, the terminal has to passively wait until the transmission requirements corresponding to the transmission parameters specified by the base station are satisfied before the terminal sends data. Then, the terminal sends data when the transmission requirements corresponding to the transmission parameters specified by the base station are satisfied. Thus, in such transmission scheme, the transmission flexibility is insufficient and the transmission efficiency of the system is not high. To solve these problems, this embodiment provides an uplink transmission method shown in FIG. 1 that illustrates a flowchart of the uplink transmission. The uplink transmission method includes the steps below.

In S102, a terminal determines at least one autonomous transmission parameter for uplink transmission.

In this embodiment, when performing uplink transmission, the terminal is not required to completely rely on a base station to configure transmission parameters and may determine at least one transmission parameter by itself. To distinguish between the one or more transmission parameters determined by the terminal and the one or more transmission parameters configured by the base station, here the transmission parameters determined by the terminal are referred to as autonomous transmission parameters, and the transmission parameters configured by the base station are referred to as scheduled transmission parameters. It is to be understood that like the scheduled transmission parameters configured by the base station, the autonomous transmission parameters determined by the terminal are also configured to indicate the uplink data transmission of the terminal, and the autonomous transmission parameters determined by the terminal are configured to indicate not only the data transmission process of the terminal, but also the detection and reception process of the data sent by the base station to the terminal.

In this embodiment, the autonomous transmission parameters of the terminal may include at least one of the actual subcarrier spacing (SCS) for at least one slot used in the current uplink transmission, the initial transmission symbol of the current uplink transmission, or the coded block group transmission information (CBGTI) of a coded block group (CBG) transmitted in the current uplink transmission. In some examples, the autonomous transmission parameters further include at least one of the end transmission symbol of the current uplink transmission or the time-domain length of the current uplink transmission. In some other examples, the autonomous transmission parameters further include at least one of the hybrid automatic repeat request (HARQ) process number, the new data indication (NDI) or the redundancy version (RV) information of the current uplink transmission. Optionally, in some examples, the autonomous transmission parameters of the terminal may be a combination of all or any of the preceding parameters.

The autonomous transmission parameters that may be determined by the terminal include the actual SCS. For example, the terminal may determine the actual SCS for the first M slots in the current uplink transmission, where M is an integer greater than 0. Before performing uplink transmission, the terminal may be required to perform listen-before-talk (LBT) processing on transmission resources to determine whether the corresponding transmission resources are idle and available. Only when the corresponding transmission resources are idle and available, can the terminal use the corresponding transmission resources to transmit data. LBT processing is generally classified into LBT processing without random backoff and LBT processing with random backoff. LBT processing without random backoff includes type-1 LBT processing and type-2 LBT processing. Type-1 LBT processing means that a transmitting end does not perform LBT processing. Type-2 LBT processing means that before performing service transmission, the transmitting end senses the idleness of a to-be-used channel for a period of time (such as 9 us or 16 us). In condition that it is determined from this period of sensing that the channel is idle, data transmission can be performed. LBT processing with random backoff includes type-3 LBT processing and type-4 LBT processing. Type-3 LBT processing and type-4 LBT processing are different in that the size of a contention window (CW) is fixed in Type-3 LBT processing while the size of a contention window is not fixed in type-4 LBT processing. Except for this difference, Type-3 LBT processing and type-4 LBT processing are similar in that the transmitting end randomly acquires a value n from a contention window and uses the value n as the backoff value. Therefore, the maximum of the backoff value n does not exceed the maximum value CW of the contention window. The backoff value n can determine the number of times the transmitting end performs listening or idleness sensing during LBT processing. For LBT processing with a backoff value of n, idleness sensing is performed n+1 times. Only when it is determined from every time of the n+1 times of idleness sensing that the to-be-used channel is idle, can the LBT processing be considered successful.

When the terminal performs type-2 LBT processing, in condition that the result of the LBT processing is successful, then the time when LBT processing succeeds is fixed and is exactly at the start time of data transmission. However, in the case where the terminal performs LBT processing with random backoff, the time when LBT processing succeeds is not fixed. Therefore, in condition that the time when LBT processing on transmission resources performed by the terminal succeeds is not at the boundary of the slot, then according to the existing scheme, the terminal is required to wait until the boundary of the slot before data transmission. This is not conducive to full use of resources and improvement of transmission efficiency. Therefore, in this embodiment, the terminal may determine the actual SCS for the first M slots in the current uplink transmission according to the time when LBT processing succeeds. In this embodiment, two schemes are provided below for the terminal to determine the actual SCS for the first M slots.

Manner one: A basic-spacing indication sent by the base station is received and a basic SCS specified by the basic-spacing indication is adjusted according to the time when LBT processing succeeds to obtain the actual SCS.

Figure 2:
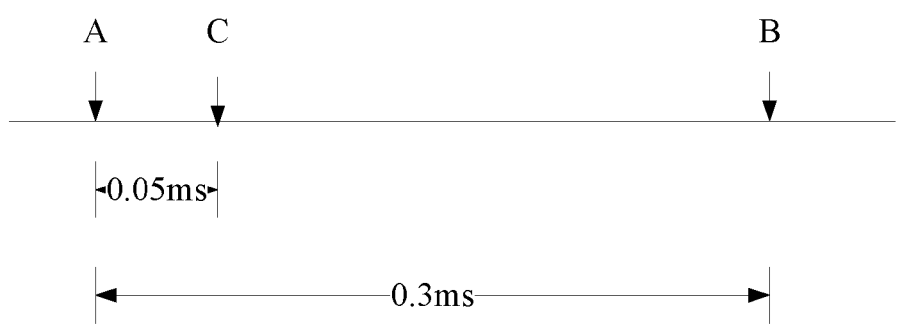
FIG. 2 is a schematic diagram illustrating that a terminal determines the actual SCS for the first transmission slot in the current uplink transmission according to the time when LBT processing succeeds according to embodiment one of the present disclosure.

For example, the basic SCS configured by the base station for a certain bandwidth part (BWP) is 30 kHz. In this case, the length of one slot is 0.5 ms. It is assumed that the time when LBT processing on transmission resources performed by the terminal succeeds is 0.3 ms away from the end time of a certain slot. As shown in FIG. 2, A denotes the time when LBT processing by the terminal succeeds, B denotes the start time of the first slot after LBT processing succeeds with the basic SCS, and the distance between A and B is 0.3 ms. According to the existing scheme, the terminal is required to wait 0.3 ms before sending data. During this 0.3 ms, the terminal may be required to send an occupancy signal all the time to occupy the transmission resource. However, according to the scheme provided in this embodiment, the terminal may set the actual SCS of the first slot after LBT processing to 60 kHz. In this manner, the length of the first slot becomes 0.25 ms. In this manner, the start time of the first slot after LBT processing succeeds is at C, and the distance between A and C is only 0.05 ms. In this case, the terminal is only required to send an occupancy signal for 0.05 ms before sending uplink data to the base station.

In the preceding example, the terminal determines the actual SCS for only the first slot in uplink transmission. However, according to the preceding description, the terminal may determine the actual SCS for the first M slots. The value of M may be 1 or may be an integer greater than 1, for example, 2, 3, 4, 5 . . . .

Manner two: One candidate SCS is selected, according to the time when LBT processing succeeds, from among at least two candidate SCSs specified by the base station and used as the actual SCS. The principle of this manner of determination and the principle of manner one are similar in that the two manners are both for purposes of reducing the time for which the terminal sends an occupancy signal and improving transmission efficiency. However, the actual SCS finally determined by the terminal is one of the candidate SCSs prespecified by the base station. For example, the SCSs provided by the base station include 30 kHz, 60 kHz and 120 kHz. In this case, the terminal finally selects 60 kHz as the actual SCS for the first slot.

Optionally, the terminal may combine the preceding two manners when determining the actual SCS for the first multiple slots in the current uplink transmission. For example, the terminal uses manner one to determine the actual SCS of the first slot and uses manner two to determine the actual SCS of the second slot.

It is to be understood that the actual SCS determined by the terminal may also correspond to the last one or more slots in the current uplink transmission. After performing type-4 LBT processing on a certain transmission resource and initiating an MCOT, the terminal may use, within the MCOT, the transmission resource to perform transmission. However, the end time of the MCOT may not be exactly at the boundary of the slot. In this case, it is possible in the related art that the last incomplete slot is not used for transmission or only some symbols in part of the slots can be transmitted. In contrast, in this embodiment, the terminal may determine, according to the end time of the MCOT of the current uplink transmission, the actual SCS for the last N slots used in the current uplink transmission, where N is an integer greater than 0.

Similarly, the terminal may also use at least one of the two manners below to determine the actual SCS for the last N slots used in the current uplink transmission.

Manner one: A basic-spacing indication sent by the base station is received and a basic SCS specified by the basic-spacing indication is adjusted according to the end time of the MCOT to obtain the actual SCS.

Figure 3:
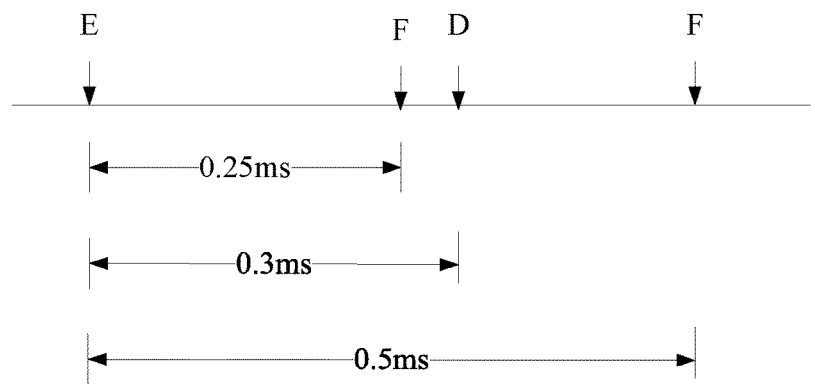
FIG. 3 is a schematic diagram illustrating that the terminal determines the actual SCS for the last transmission slot in the current uplink transmission according to the end time of the MCOT according to embodiment one of the present disclosure.

For example, the terminal determines that there is 0.8 ms remaining between the start transmission time and the end time of the MCOT. It is assumed that the basic slot sent by the base station is 0.5 ms and the corresponding SCS is 30 kHz. As shown in FIG. 3, D denotes the end time of the MCOT, and E and F denote the start boundary of the last slot of the MCOT and the end boundary of the last slot of the MCOT respectively. According to the existing scheme, the terminal may use only the first slot to perform transmission. 0.3 ms in the MCOT cannot be used. In contrast, according to the uplink transmission method provided in this embodiment, the terminal may adjust the actual SCS of the last slot from 30 kHz of the basic SCS to 60 kHz according to the end time of the MCOT. In this manner, the length of the last slot becomes 0.25 ms. Through adjustment, the end boundary of the last slot is changed to G and the length of the first slot is still 0.5 ms. Therefore, the terminal can effectively use the 0.75 ms time in the MCOT to perform transmission, leaving only 0.05 ms.

Manner two: One candidate SCS is selected, according to the end time of the MCOT, from among at least two candidate SCSs specified by the base station and used as the actual SCS.

For example, the SCSs provided by the base station include 15 kHz, 30 kHz and 60 kHz. In this case, the terminal finally selects 60 kHz as the actual SCS for the last slot. In some examples of this embodiment, the terminal may set the SCS for each slot in the current uplink transmission to 60 kHz. In this manner, the MCOT can contain three complete slots, each having a duration of 0.25 ms and totally still having a duration of 0.75 ms.

Optionally, the terminal may combine the preceding two manners when determining the actual SCS for the last multiple slots in the current uplink transmission. For example, the terminal uses manner one to determine the actual SCS of the last slot and uses manner two to determine the actual SCS of the second last slot.

According to the preceding description, the two manners in which the terminal determines the actual SCS for the first M slots and the two manners in which the terminal determines the actual SCS for the last M slots are substantially the same in principle.

In the case where the time when LBT processing performed by the terminal succeeds is not at the boundary of the slot, the terminal may use the manner below to reduce the sending of an occupancy signal and improve resource utilization.

In this embodiment, the terminal may determine the initial transmission symbol of uplink transmission by itself according to the time when LBT processing succeeds. For example, the terminal determines to use the Kth symbol after the time when LBT processing succeeds as the initial transmission symbol, where K may be an integer greater than or equal to 1 and less than a preset threshold. Generally, to reduce the sending of an occupancy signal, the terminal may set K to 1. In this manner, after LBT processing succeeds, the terminal may start data transmission from the most recent transmission symbol.

In order for the base station to know the continuous process of the current uplink transmission, when the terminal determines the initial transmission symbol of the current uplink transmission, that is, when the autonomous transmission parameters include the initial transmission symbol, the terminal may determine at least one of the end transmission symbol of the current uplink transmission or the time-domain length of the current uplink transmission as autonomous transmission parameters concurrently.

According to the preceding description, the autonomous transmission parameters may further include CBGTI. That is, in this embodiment, the terminal may select CBGs that are to be transmitted during the current uplink transmission. It is assumed that one transport block (TB) includes four CBGs. In the case of first transmission of this TB, the terminal may transmit one, multiple or all of the four CBGs and determine the CBGTI of CBGs to be transmitted during the current transmission as one of the one or more autonomous transmission parameters of the current uplink transmission. It is to be understood that the uplink transmission of the terminal may include TB retransmission as well as the first TB transmission. For example, in condition that after the first transmission of CBG 1, CBG 2, CBG 3 and CBG 4 in a certain TB is performed, the base station reports that CBG 2 and CBG 3 fail to be detected and received, then the CBGs currently to be transmitted include CBG 2 and CBG 3 required to be retransmitted.

Assuming that currently the TB corresponding to only one HARQ process contains CBGs to be transmitted, then the terminal may select one or more CBGs from among the CBGs to be transmitted in the TB and include the CBGTI of the selected CBGs in the autonomous parameters. In some examples of this embodiment, the terminal may determine at least one of the HARQ process number corresponding to the TB, the new data indication (NDI) corresponding to the TB, or the redundancy version (RV) information corresponding to the TB concurrently.

Assuming that currently TBs corresponding to more than one HARQ process are required to be transmitted, then the terminal may determine the HARQ process number corresponding to the current uplink transmission, select CBGs to be transmitted from among the TB corresponding to the determined HARQ process and then determine CBGTI. Of course, the terminal may determine the NDI and the RV information as autonomous transmission parameters when using the CBGTI and the HARQ process number as autonomous transmission parameters. The NDI is configured to indicate whether data in a currently transmitted CBG is new data or retransmitted data. The channel-coded (turbo coder) data of the TB includes three segments. The first segment may be considered as basic data. The remaining two segments are redundant data. The three segments of data are placed in a ring buffer in sequence. The RV information actually indicates from which position of this buffer a data receiving end fetches data. In this embodiment, each RV may be pre-agreed by the terminal and the base station. In each uplink transmission, the terminal may determine which RV is used in the current uplink transmission, thereby autonomously determining the current RV information.

In some other examples of this embodiment, the order in which RVs are used may be pre-agreed by the base station and the terminal. For example, the RVs include version A, version B and version C, and the base station and the terminal pre-agree that version B is used in the first transmission of a TB, version C is used in the second transmission of the TB and version A is used in the third transmission of the TB. In this case, the terminal may transmit data by using corresponding RVs in the pre-agreed order without determining the RV information by itself.

In S104, the terminal sends the at least one autonomous transmission parameter to the base station.

After determining the autonomous transmission parameters, the terminal may send the autonomous transmission parameters to the base station so that the base station can receive uplink data from the terminal based on the autonomous transmission parameters. In an example of this embodiment, the terminal may carry the autonomous transmission parameters in uplink control information (UCI) and send the autonomous transmission parameters to the base station. The terminal may transmit the UCI by using a physical uplink control channel (PUCCH) or a physical uplink shared channel (PUSCH). When transmitting the UCI by using the PUSCH, the terminal may transmit the UCI in a predefined position of a demodulation reference signal (DMRS). Transmission of the autonomous transmission parameters by using the PUSCH enables a reduction in the occupation of spectrum resources in uplink transmission and an improvement in the utilization of spectrum resources.

In S106, the terminal sends uplink data to the base station according to the at least one autonomous transmission parameter.

The base station may receive the UCI from the position corresponding to the DMRS signal, thereby acquiring the autonomous transmission parameters indicating the detection and reception of uplink data. Then, the base station detects and receives, according to the autonomous transmission parameters, uplink data sent by the terminal. In some examples of this embodiment, the autonomous transmission parameters sent by the terminal to the base station include all transmission parameters required for uplink transmission. In this case, the base station may perform the detection and reception of uplink data according to the received autonomous transmission parameters. In some other examples of this embodiment, the autonomous transmission parameters determined by the terminal are only part of the transmission parameters required for uplink transmission. In this case, the remaining transmission parameters may be determined by the base station. For example, the base station sends the scheduled transmission parameters to the terminal and then the terminal sends uplink data according to the autonomous transmission parameters and the scheduled transmission parameters. After receiving the autonomous transmission parameters sent by the terminal, the base station detects and receives uplink data according to the autonomous transmission parameters and the scheduled transmission parameters.

According to the preceding description, the terminal may be required to perform LBT processing on transmission resources before performing uplink transmission. In this embodiment, transmission resources whose LBT processing is to be performed by the terminal may be indicated and determined by the base station. For example, the base station sends an LBT processing indication to the terminal. Each of the transmission resources here may be jointly determined by a time domain, a frequency domain and a beam direction. That is, the three parameters may determine one transmission resource, and when any one of the parameters changes, the corresponding transmission resource also changes. The LBT processing indication includes time-domain indication information, frequency-domain indication information and beam direction indication information for indicating transmission resources whose LBT processing is to be performed. In condition that the time-domain indication information, frequency-domain indication information and beam direction indication information included in the LBT processing indication sent by the base station can determine only one transmission resource, the terminal can directly perform LBT processing on this transmission resource. In some examples of this embodiment, the time-domain indication information, frequency-domain indication information and beam direction indication information included in the LBT processing indication may indicate at least two transmission resources concurrently. When at least two transmission resources are specified in the LBT processing indication, the terminal may perform LBT processing on one or more of these transmission resources and then transmit data by using at least one of transmission resources whose LBT processing is successful.

In this embodiment, the time-domain indication information may include an uplink transmission period configured for the terminal. The uplink transmission period is determined and configured by the base station. In an example of this embodiment, in condition that the time-domain indication information includes only the uplink transmission period, as long as the terminal is in the uplink transmission period and the terminal currently is required to send data to the base station, it is feasible to perform LBT processing on transmission resources and transmit data after the LBT processing succeeds.

In another example of this embodiment, the time-domain indication information includes not only the uplink transmission period configured by the base station for the terminal, but also a slot opportunity indication configured to indicate whether each slot in the uplink transmission period allows autonomous uplink transmission. For example, the slot opportunity indication for the uplink transmission period is presented in the form of a bitmap. Each data bit in the bitmap corresponds to the respective slot in the uplink transmission period. In condition that the base station allows the terminal to perform uplink transmission in a certain slot, the data bit corresponding to the slot is "0"; otherwise, the data bit corresponding to the slot is "1". In condition that uplink transmission period t1-t2 indicated by the base station contains five slots and the bitmap corresponding to the uplink transmission period is "01001", then the base station allows the terminal to perform uplink transmission in slots 1, 3 and 4 while the terminal has no uplink transmission opportunity in slots 2 and 5. In such scheme, when the terminal has uplink data to be sent, the terminal is required to perform LBT processing in a slot selected from within the uplink transmission period according to the time-slot opportunity indication in response to presence of the to-be-transmitted uplink data, and then to transmit data after the LBT processing succeeds.

The frequency-domain indication information includes at least one uplink transmission frequency band configured by the base station for the terminal and a frequency band opportunity indication configured to indicate whether an uplink transmission frequency band allows uplink autonomous transmission. Similar to the preceding second type of time-domain indication information, such frequency-domain indication information is configured to instruct the terminal to select a frequency-domain position from within each uplink transmission frequency band according to the frequency band opportunity indication when the terminal has uplink data to be sent, to determine, according to the selected frequency-domain position, transmission resources whose LBT processing is to be performed, and then to perform LBT processing on the transmission resources.

In an example of this embodiment, the frequency band opportunity indication may also be presented in the form of a bitmap. For example, each uplink transmission frequency band corresponds to the respective data bit in the bitmap. In condition that a frequency-domain position is available in an uplink transmission frequency band for the terminal to perform uplink transmission, the value of the bitmap data bit corresponding to the uplink transmission frequency band indicates yes; otherwise, the value of the bitmap data bit corresponding to the uplink transmission frequency band indicates no. For example, the base station indicates two interleaving units for the terminal, namely interleaving unit A and interleaving unit B, then two data bits are present in the bitmap, where "0" indicates yes and "1" indicates no. It is to be understood that one interleaving unit contains equally spaced M resource blocks (RBs) or N resource elements (REs). M and N are numerical values related to the BWP size or the system bandwidth. In this embodiment, to reduce signaling overhead, the base station specifies the same available frequency-domain positions in each uplink transmission frequency band. Assuming that available frequency-domain positions in interleaving unit A are subcarriers 1, 3, 5 and 7, then available frequency-domain positions in interleaving unit B are also subcarriers 1, 3, 5 and 7. Thus, in condition that each uplink transmission frequency band specified by the base station has the same frequency-domain positions, the terminal can determine available frequency-domain positions in each uplink transmission frequency band simply after the base station specifies available frequency-domain positions in one uplink transmission frequency band.

In some examples of this embodiment, the beam direction information may be determined by spatial parameter information in sounding reference signal (SRS) resource configuration. One set of SRS spatial parameters corresponds to one beam direction. In some examples of this embodiment, one piece of beam direction information may include one SRS resource set. One SRS resource set includes at least two SRSs. Each SRS corresponds to a different beam direction.

In the uplink transmission method provided in this embodiment of the present disclosure, the terminal determines one or more autonomous transmission parameters by itself, sends the determined transmission parameters to the base station, and then performs uplink data transmission with the base station based on these autonomous transmission parameters. In this manner, the terminal can determine the transmission policy flexibly according to, for example, the current transmission environment without blindly performing transmission according to the indication of the base station, thereby improving the flexibility of autonomous uplink transmission of the terminal and facilitating the improvement of the transmission efficiency and the utilization of transmission resources.

Embodiment Two

With the explosive growth of the communication demand, spectrum resources are becoming increasingly tight. To meet the exponentially increasing demand, additional spectrums are required. Due to the limited number of licensed spectrums, communication providers need to seek unlicensed spectrums, that is, unlicensed carriers to solve the problem. Compared with licensed carriers, unlicensed carriers have the advantages of free or low costs, low access requirements, resource sharing, more wireless access technologies and more sites. At present, project research on the transmission operation of unlicensed carriers in the 3GPP technology has been initiated.

Generally, before service transmission is performed using an unlicensed carrier, LBT is required to be performed. LBT is also called listen before talk or called clear channel assessment (CCA). LBT processing refers to the process of listening to the carrier to be used for service transmission and determining whether the carrier is free and available. Only after LBT processing succeeds, can a device send data on the unlicensed carrier. To increase the probability of successful LBT on the unlicensed carrier and increase the chance of data transmission, a base station may configure multiple transmission resources for a terminal through radio resource control (RRC) signaling. The multiple transmission resources mean that the terminal can have multiple transmission opportunities. It is to be understood that the RRC signaling here is equivalent to the LBT processing indication of the preceding embodiment.

In this embodiment, the base station configures a periodic TU for the terminal and uses a bitmap to indicate whether there is an opportunity for uplink autonomous transmission in each slot in the periodic TU. When the terminal has uplink data to be sent, the terminal may select the most recent slot that has an opportunity for uplink autonomous transmission and perform LBT processing in the corresponding frequency-domain position and beam direction in the selected slot.

Additionally, to indicate the frequency-domain information of transmission resources, the base station assigns, in the RRC signaling, interleaving units 1 to 6 to the terminal and indicates, in the form of a bitmap, whether each interleaving unit is assigned frequency-domain resources for data transmission of the terminal. Moreover, it is indicated through signaling that in an interleaving unit, even-numbered subcarriers are frequency-domain positions available for the terminal.

Furthermore, in this embodiment, the base station configures multiple spatial beam directions for the terminal through an SRS resource set. Different SRSs correspond to different spatial beam directions.

The terminal may determine, according to the RRC signaling, multiple transmission resources specified by the base station and then perform LBT on these transmission resources. After the LBT processing succeeds, the terminal may select one or more transmission resources and perform uplink autonomous transmission of data on the one or more transmission resources. Optionally, in condition that the terminal is required to perform LBT processing on multiple transmission resources, the terminal may perform LBT processing concurrently in the same frequency-domain position and different spatial beam directions. Alternatively, the terminal may perform LBT processing concurrently in different frequency-domain positions and the same beam direction. Alternatively, the terminal may perform LBT processing multiple times in the same frequency-domain position and the same beam direction at different times. By performing LBT processing on multiple transmission resources, the terminal can increase the probability of successful uplink LBT, thereby increasing the opportunity for autonomous uplink transmission of unlicensed carriers.

After the LBT processing succeeds, the terminal may perform autonomous uplink transmission. According to embodiment one, the terminal in this embodiment may determine part of the transmission parameters by itself. When the autonomous transmission parameters determined by the terminal include SCS, the terminal may determine the actual SCS of at least one slot based on the distance between the time when LBT processing succeeds and the boundary of the slot in the principle of ensuring that a minimum number of occupancy signals are sent and include the value of the SCS in UCI.

Of course, the SCS corresponding to each slot of uplink transmission of the terminal may also be determined in other manners. Examples of these manners are described below.

Manner 1: The terminal and the base station pre-agree on SCSs used by certain channels and signals. In this manner, after an uplink transmission channel or signal is determined, the terminal can determine the corresponding actual SCS. In some examples of this embodiment, the base station and the terminal may configure multiple SCSs for one frequency band. The terminal may arbitrarily select an SCS when performing uplink transmission. The base station may try on the pre-agreed SCSs one by one when detecting and receiving uplink data.

Manner 2: The base station indicates an SCS for the terminal in a semi-static configuration manner. For example, the base station notifies the terminal of the SCS corresponding to a certain BWP on an unlicensed carrier through any one of synchronous signal block (SSB) information, remaining system information (RMSI) or RRC signaling.

Manner 3: The base station dynamically indicates the SCS of a certain MCOT or a certain slot through DCI. Optionally, the base station may also indicate the SCS of each slot through a slot bitmap. Alternatively, the base station and the terminal agree that each time an SCS indication is received, and the SCS is obtained by doubling the previous SCS value. For example, assuming that the SCS of the first slot is 15 kHz, then when the base station sends an SCS indication for the second slot, the SCS corresponding to the second slot is 30 kHz. When multiple consecutive slots have the same SCS, the base station may notify the terminal in the form of "start slot+the number of consecutive slots". For example, in the case where the base station sends an SCS indication similar to "5+6" to the terminal, the current SCS is configured to indicate the subcarriers of six consecutive slots starting from the fifth slot.

Manner 4: The base station specifies an SCS for the terminal in a "semi-static+dynamic" manner. For example, the base station semi-statically configures at least two candidate SCS sets and then dynamically indicates, for the terminal, the SCS set to be used for the current uplink transmission. Alternatively, the base station may semi-statically configure the SCS of each intermediate slot in uplink transmission and then dynamically indicate the SCS of at least one of the first slot or the last slot.

Figure 4:
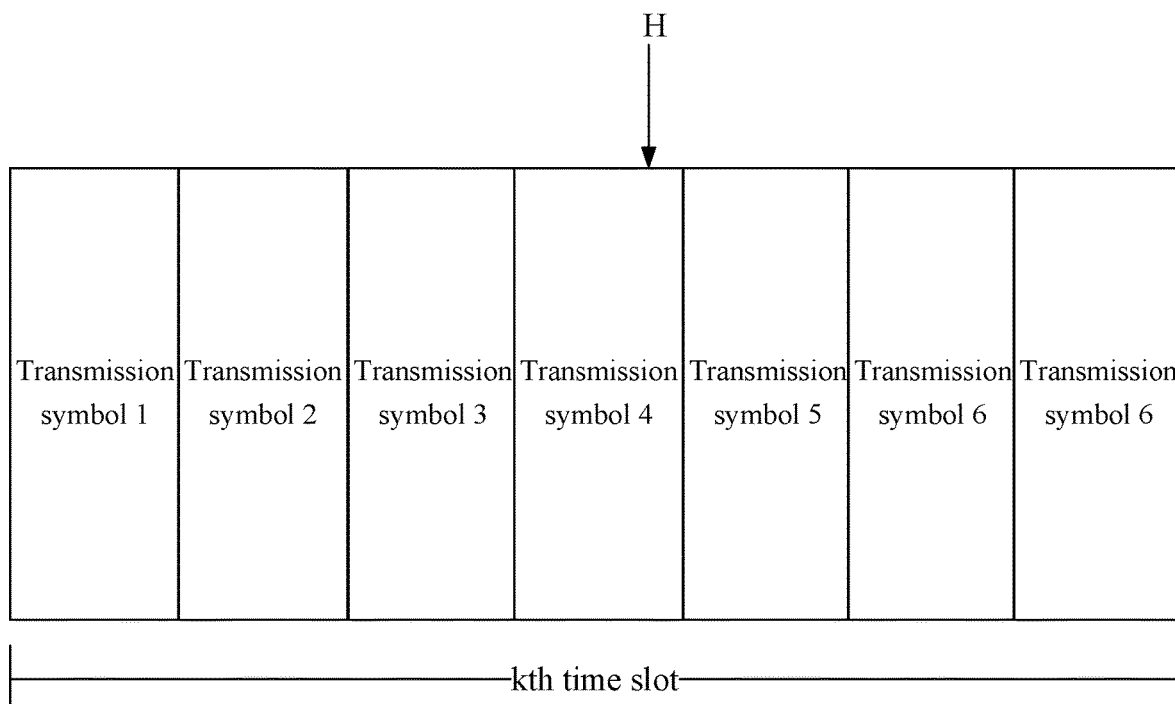
FIG. 4 is a schematic diagram illustrating that the terminal determines the initial transmission symbol of the current uplink transmission according to the time when LBT processing succeeds according to embodiment one of the present disclosure.

In this embodiment, the terminal may determine the SCS of at least one slot in uplink transmission by itself or determine the initial transmission symbol of the current uplink transmission by itself to improve the utilization of transmission resources in the case where the terminal performs LBT processing with random backoff and the time when LBT processing succeeds is not the boundary of the slot. In this embodiment, when the time when LBT processing by the terminal succeeds is not the boundary of the slot, the terminal may start uplink data transmission at the transmission symbol nearest to the time when LBT processing succeeds and notify the initial transmission symbol to the base station through UCI. For example, as shown in FIG. 4, during a certain uplink transmission, the time H when LBT processing succeeds is nearest to transmission symbol 5 of the kth slot. The terminal may choose to start data transmission at transmission symbol 5 of the kth slot, that is, use transmission symbol 5 as the initial transmission symbol and send information indicating transmission symbol 5 to the base station.

Further, in some cases, the terminal cannot end data transmission at the boundary of the slot. At this time, the terminal is required to notify the base station of the end transmission symbol of uplink data transmission. For example, in FIG. 4, the end time of an MCOT is at transmission symbol 3 in the mth slot, so the terminal may send "0011" to tell the base station the end transmission symbol of the current uplink data transmission. Of course, in some examples of this embodiment, the terminal may not notify the end transmission symbol of uplink transmission. Instead, the terminal may notify the base station of the time-domain length of the current uplink transmission. In an example, the autonomous transmission parameters sent by the terminal to the base station include a time-domain length. For example, the time-domain length is 18 transmission symbols. The base station can determine, according to this information, that the terminal is to transmit 18 transmission symbols in the current uplink transmission. The current uplink transmission ends after 18 transmission symbols from the initial transmission symbol are received.

In this embodiment, the process for the terminal to perform LBT processing is described. According to the uplink transmission method of this embodiment, the base station indicates multiple transmission resources for the terminal, thereby improving the probability that LBT processing by the terminal succeeds, the opportunity for the terminal to perform uplink data transmission, and the user experience on the terminal.

Further, the terminal determines the actual SCS of at least one slot in uplink transmission by itself so that the terminal can change the length of a complete slot by increasing the size of the SCS of the slot, thereby reducing the sending of an occupancy signal and improving spectrum utilization. Alternatively, the terminal can select the position of the initial transmission symbol position and the position of the end transmission symbol in uplink transmission according to the time when LBT processing succeeds, thereby improving the flexibility of uplink data transmission and improving resource utilization.

Embodiment Three

To make the various details of the uplink transmission method of embodiment one more apparent to those skilled in the art, a further description is given in this embodiment based on the preceding embodiment to illustrate part of the various details. In this embodiment, an example is described in which the autonomous transmission parameters include CBGTI.

After performing LBT successfully, the terminal may transmit one or more CBGs in one TB within one period. Meanwhile, the terminal carries CBGTI in UCI. Optionally, CBGTI is presented in the form of a bitmap to indicate, for the base station, which CBG(s) in the TB are transmitted in the current uplink transmission. It is to be understood that CBGs transmitted in the same uplink transmission share the same HARQ process. The terminal may notify the base station of the HARQ process number. Moreover, the terminal may indicate, through NDI, whether a new TB is transmitted or CBGs in a TB that has been transmitted are retransmitted in this HARQ process.

For example, assuming that the base station semi-statically configures four CBGs in one TB, the base station feeds back NACK information after the terminal sends the four CBGs in the TB through HARQ process 2 for the first time, and NACK information indicates that CBG 2 to CBG 4 all fail to be transmitted. Then, the terminal may choose to retransmit CBG(s) of CBG 2 to CBG 4. The terminal may concurrently retransmit all of the three CBGs that fail to be transmitted or may retransmit one or two of the three CBGs. For example, the terminal may indicate, in UCI, the CBGTI of CBG 2, CBG 3 and CBG 4 by using a bitmap like "0111". Moreover, the terminal may send NDI and HARQ process number "2" of the current uplink transmission to the base station. After receiving the information, the base station can know that CBG 2 to CBG 4 of the original TB of HARQ process 2 are retransmitted in the current uplink transmission.

As regards RV information, the RVs of the multiple CBGs are the same, and the terminal and the base station pre-agree the RV used in each transmission. For example, the version order is "version 0, version 2, version 1 and version 3". The current transmission is the first retransmission, actually the second transmission, so the RV of the current transmission is "version 2". Since the two ends of the data transmission have pre-agreed the RV used in each transmission, the terminal may not carry RV information in UCI. In some examples of this embodiment, the terminal may select the RV used in the current uplink transmission by itself. In this case, the terminal may carry RV information as an autonomous transmission parameter in UCI and send the RV information to the base station at the predefined DMRS position of a PUSCH.

After detecting and receiving uplink data, the base station may feed back, in the form of a bitmap, the reception status of each CBG in the current uplink transmission.

In the uplink transmission method provided in this embodiment, the terminal can determine CBG(s) to be transmitted in the uplink, thereby greatly improving the flexibility of uplink transmission of the terminal.

Embodiment Four

In the related art, when a terminal has uplink data to be sent, the terminal may perform, as indicated by the base station, LBT processing with random backoff, for example, type-4 LBT processing, on target transmission resources to be used in uplink transmission, thereby initiating an MCOT, and then the terminal performs uplink transmission in the MCOT. However, in condition that uplink transmission of the terminal does not require all of the MCOT, the remaining time of the MCOT is wasted. When another transmitting end requires the target transmission resources for transmission, the transmitting end may spend a large amount of time reperforming LBT processing with random backoff. This leads to underutilization of communication resources of the system and affects the transmission performance of the system. To solve this problem, this embodiment provides a communication method. To facilitate understanding of this embodiment by those skilled in the art, concepts used in this embodiment are described below before the communication method is described in detail.

"First-transmission terminal" refers to a terminal that performs LBT processing with random backoff for target transmission resources and initiates MCOT. "Sharing-transmission end" refers to a data transmitting end that multiplexes remaining time of MCOT initiated by a first-transmission terminal but not used up in uplink transmission of the first-transmission terminal. "Target transmission resource" refers to a transmission resource used in uplink data transmission of a first-transmission terminal after LBT processing succeeds.

Figure 5:
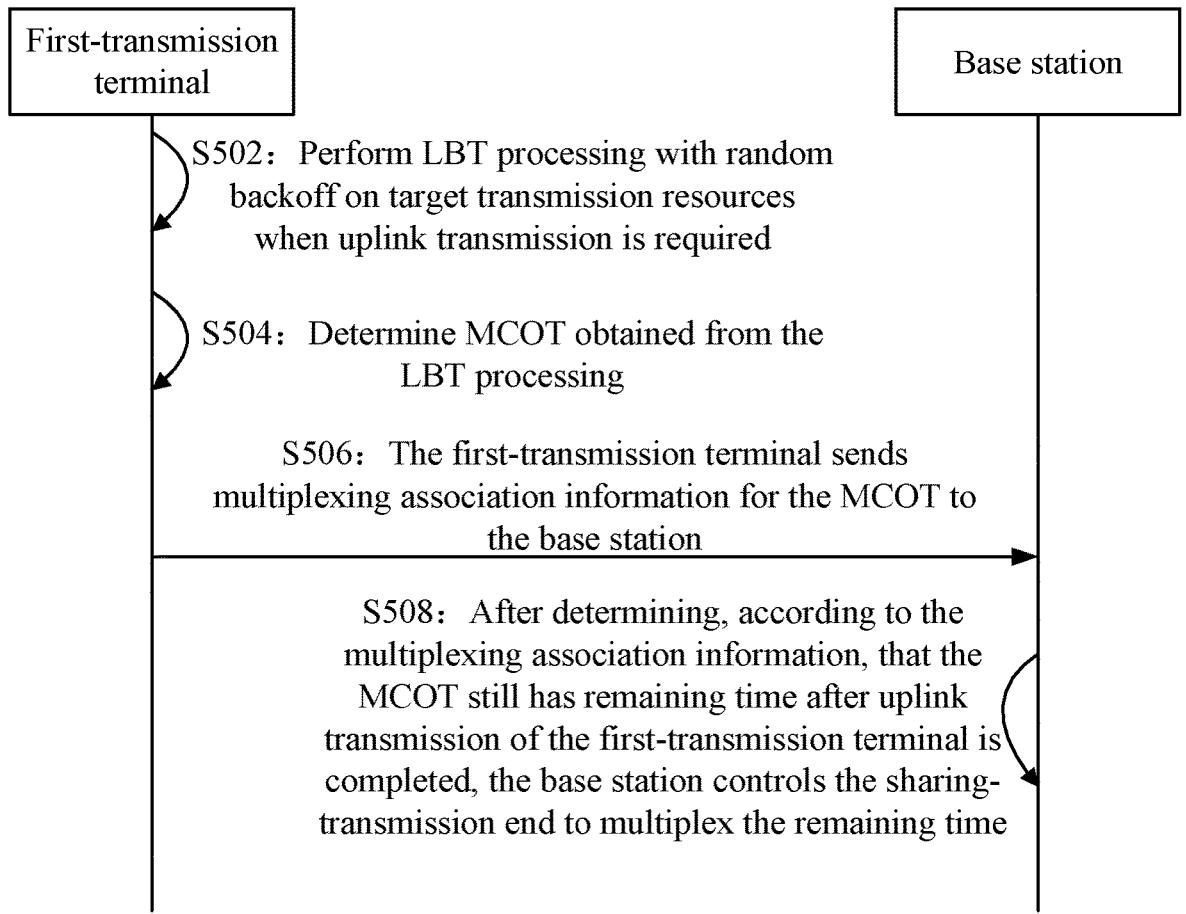
FIG. 5 is a flowchart of a communication method according to embodiment four of the present disclosure.

The steps of the communication method of this embodiment are described below with reference to FIG. 5 that illustrates the flowchart of this method.

In S502, a first-transmission terminal performs LBT processing with random backoff on target transmission resources when uplink transmission is required.

In this embodiment, the LBT processing on the transmission resources may be performed by the first-transmission terminal according to the LBT indication of the base station. According to the preceding embodiment, the base station may specify, in the LBT indication, for example, RRC signaling, multiple candidate transmission resources for the terminal, and the first-transmission terminal may perform LBT processing on some or all of the candidate transmission resources and then select at least one of transmission resources whose LBT processing is successful as the target transmission resource. In other examples of this embodiment, the first-transmission terminal may select only one of the candidate transmission resources and perform LBT processing on the selected candidate transmission resource. In condition that the LBT processing succeeds, this transmission resource is used as the target transmission resource. In condition that the LBT processing fails, no target transmission resource is available temporarily and data transmission is not performed.

It can be seen that a transmission resource that receives LBT processing by the first-transmission terminal is not necessarily a target transmission resource, but a target transmission resource necessarily receives LBT processing by the first-transmission terminal.

In S504, the first-transmission terminal determines MCOT obtained from the LBT processing.

Although a target transmission resource always receives LBT processing with random backoff, the MCOT varies with different LBT processing processes. In some examples of this embodiment, the size of the MCOT is related to the size of the random-backoff value of performed LBT processing with random backoff or related to the size of the contention window of performed type-4 LBT processing. Therefore, after LBT processing succeeds, the first-transmission terminal can determine the size of the MCOT obtained in the current LBT processing.

In S506, the first-transmission terminal sends multiplexing association information for the MCOT to the base station.

Then, the first-transmission terminal sends the multiplexing association information for the MCOT to the base station. The multiplexing association information at least enables the base station to determine whether the MCOT has, after the current uplink transmission of the first-transmission terminal is completed, remaining time for data transmission of the sharing-transmission end.

Further, in some examples of this embodiment, the multiplexing association information not only enables the base station to determine whether the current MCOT has remaining time for data transmission of the sharing-transmission end, but also enables, when the base station determines that remaining time is available, the second communication device 12 to determine which type of LBT processing by the sharing-transmission end should target transmission resources receive.

For example, in an example of this embodiment, the first-transmission terminal may send first information indicating the end time of the MCOT to the base station and use the first information as the multiplexing association information. In this manner, after receiving the first information, the base station can determine, according to the current time, whether the subsequent time belongs to the MCOT.

For example, the first information may be the number of at least one of slots or symbols currently remaining in the MCOT. In some cases, the first information includes only the number of slots currently remaining in the MCOT. For example, when three complete slots and two symbols remain in the MCOT, the first-transmission terminal notifies the base station that four slots remain currently. Of course, in this case, the first-transmission terminal may also convert the remaining actual time into the number of remaining symbols and feed back the number of remaining symbols to the base station. For example, the first information of the first-transmission terminal indicates that 23 symbols remain in the MCOT. In some cases, the first information includes only the number of symbols currently remaining in the MCOT. For example, when only five symbols remain in the MCOT, the first-transmission terminal notifies the base station that five symbols remain currently. Similarly, in this case, the first-transmission terminal may also convert the remaining actual time into the number of remaining slots and feed back the number of remaining slots to the base station. For example, the first information sent by the first-transmission terminal to the base station indicates that five or seven slots remain in the MCOT. Optionally, in these two cases, the first-transmission terminal may also combine the preceding two types of first information and indicate the combined information for the base station. For example, when at least one complete slot remains in the MCOT, the first-transmission terminal indicates only the number of remaining slots for the base station; when less than one complete slot remains in the MCOT, the first-transmission terminal indicates the number of remaining symbols for the base station.

In other examples, the first-transmission terminal may know the feedback time configured by the base station for the current uplink transmission. Since the feedback time is also known by the base station, the first-transmission terminal may indicate the location of the feedback time in the MCOT for the base station and send this location to the base station, with this location used as the first information. In this manner, the base station can determine the end time of the MCOT based on the feedback time configured by itself, thereby determining how much time currently remains before the end of the MCOT.

Optionally, the first information may include the position of the feedback time in the MCOT in addition to at least one of the number of at least one of slots or symbols currently remaining in the MCOT.

In an example of this embodiment, the first-transmission terminal may use, as the multiplexing association information, type information for indicating LBT processing performed when the sharing-transmission end multiplexes the remaining time and then send the base station the multiplexing association information. In this manner, after receiving the multiplexing association information, the base station can determine the type of LBT processing on target transmission resources by the sharing-transmission end simply by parsing the multiplexing association information instead of determining the type of LBT processing according to the remaining time of the MCOT.

It is to be understood that it is also feasible that the multiplexing association information includes both the first information and the type information for indicating, for the base station by the first-transmission terminal, LBT processing performed when the sharing-transmission end multiplexes the remaining time. In some examples of this embodiment, the first-transmission terminal may send the multiplexing association information to the base station in one or part of the slots of the uplink transmission of the base station. However, to avoid the problem in which the base station cannot know the end time of the MCOT and cannot determine whether the MCOT has remaining time due to unsuccessful detection of reception, in some examples of this embodiment, the first-transmission terminal may send the multiplexing association information to the base station in each slot of the uplink transmission.

In S508, after determining, according to the multiplexing association information, that the MCOT still has remaining time after uplink transmission of the first-transmission terminal is completed, the base station controls the sharing-transmission end to multiplex the remaining time.

After the base station receives the multiplexing association information sent by the first-transmission terminal, the base station may determine, according to the multiplexing association information, whether the MCOT still has remaining time when the current uplink transmission of the first-transmission terminal is completed. In condition that the determination result is yes, the base station may control the sharing-transmission end to multiplex the remaining time. In this embodiment, the sharing-transmission end may be the first-transmission terminal, the base station, or a terminal located in the same cell as the first-transmission terminal, especially a terminal relatively close to the first-transmission terminal, for example, a terminal less than the preset distance threshold away from the first-transmission terminal.

Figure 6:
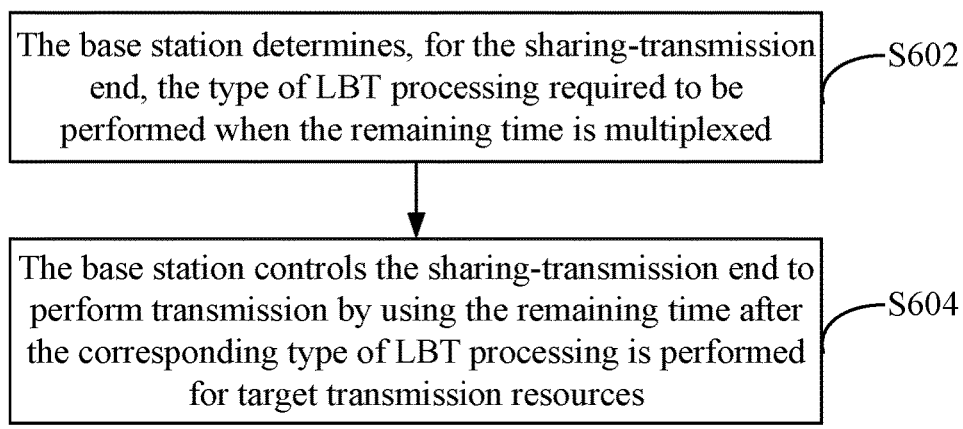
FIG. 6 is a flowchart illustrating that a base station controls a sharing-transmission end to multiplex the remaining time according to embodiment four of the present disclosure.

The following describes the process for the base station to control the sharing-transmission end to multiplex the remaining time of the MCOT. The steps of this process are described below with reference to FIG. 6 that illustrates the flowchart of this process.

In S602, the base station determines, for the sharing-transmission end, the type of LBT processing required to be performed when the remaining time is multiplexed.

In this embodiment, the base station may determine, according to at least one of the multiplexing association information, information about a transmitting end and a receiving end, or a beam relationship, the type of LBT processing required to be performed when the remaining time is multiplexed. As described earlier, the multiplexing association information may indicate the type of LBT processing performed when the sharing-transmission end multiplexes the remaining time. Therefore, in this case, after receiving and parsing the multiplexing association information, the base station can determine what type of LBT processing is to be performed by the sharing-transmission end.

The following describes a scheme for the base station to determine, according to the information about the transmitting end and the receiving end, the type of LBT processing for the sharing-transmission end.

The "information about the transmitting end and the receiving end" here refers to whether data transmitted by the sharing-transmission end in the multiplexed remaining time is related to the first-transmission terminal. For example, in condition that the transmitting end or the receiving end of the data transmitted in the multiplexed remaining time is the first-transmission terminal, the data transmitted in the remaining time is related to the first-transmission terminal; otherwise, the data transmitted in the remaining time is not related to the first-transmission terminal. For example, data is sent by the base station to another terminal in the same cell or sent by another terminal in the same cell to the base station. In both of the two cases, data transmission is not related to the first-transmission terminal.

In condition that the information about the transmitting end and the receiving end indicates that data to be transmitted by the sharing-transmission end is related to the first-transmission terminal, the base station determines that the sharing-transmission end may perform LBT processing without random backoff. According to embodiment one, LBT processing without random backoff includes type-1 LBT processing and type-2 LBT processing. That is, when multiplexing the remaining time of the MCOT, the sharing-transmission end may not perform LBT on target transmission resources or may perform t ms sensing.

It is to be understood that data transmitted in the remaining time may be related to the first-transmission terminal in two cases. One is that the first-transmission terminal serves as the sharing-transmission end. The other is that the base station serves as the sharing-transmission end and sends data to the first-transmission terminal. In the first case, the first-transmission terminal may perform scheduled uplink transmission, continuously semi-persistently scheduled uplink transmission or autonomous uplink transmission. Moreover, in condition that data transmission performed by the first-transmission terminal during the remaining time is continuous with data transmission performed by the first-transmission terminal when the MCOT is initiated, that is, there is no turning point between uplink and downlink, the first-transmission terminal may perform type-1 LBT processing.

In condition that the information about the transmitting end and the receiving end indicates that data to be transmitted by the sharing-transmission end is not related to the first-transmission terminal, the base station may determine, according to the time difference $\Delta t$ between the earliest transmission time of the sharing-transmission end and the first-transmission end time of the first-transmission terminal, the type of LBT processing required to be performed. The first-transmission end time here is the end time of the first uplink transmission after the first-transmission terminal initiates the MCOT. The earliest transmission time here is the earliest time when the sharing-transmission end is allowed to transmit in the remaining time of the MCOT. The earliest transmission time is determined based on type-1 LBT processing performed by the sharing-transmission end. That is, the earliest transmission time is the earliest transmission time allowed when it is assumed that the sharing-transmission end does not perform LBT in the remaining time.

For example, in condition that the time difference $\Delta t$ is less than or equal to a first time threshold, it is determined that the sharing-transmission end requires to perform type-1 LBT processing; in condition that the time difference $\Delta t$ is greater than the first time threshold and less than a second time threshold, it is determined that the sharing-transmission end requires to perform type-2 LBT processing; and in condition that the time difference $\Delta t$ is greater than the second time threshold, it is determined by the base station that the sharing-transmission end requires to perform LBT processing with random backoff, for example, type-4 LBT processing. The first time threshold and the second time threshold here may be two predefined values.

The following describes a scheme for the base station to determine, according to the beam relationship, the type of LBT processing for the sharing-transmission end.

The "beam relationship" is between the beam direction used by the sharing-transmission end and the first-transmission beam direction of the first-transmission terminal. The first-transmission beam direction is used in the first uplink transmission after the first-transmission terminal initiates the MCOT. The beam direction used by the sharing-transmission end and the first-transmission beam direction may be the same or different. Optionally, in condition that the sharing-transmission end and the first-transmission terminal use the same beam direction in the first uplink transmission, the base station may determine that the sharing-transmission end performs type-2 LBT processing; in condition that the beam direction used by the sharing-transmission end is different from the first-transmission beam direction used in the first uplink transmission after the first-transmission terminal initiates the MCOT, then the base station may determine that the sharing-transmission end performs LBT processing with random backoff, that is, type-3 or type-4 processing.

In S604, the base station controls the sharing-transmission end to perform transmission by using the remaining time after the corresponding type of LBT processing is performed for target transmission resources.

After determining the type of LBT processing to be performed for data transmission to be performed by the sharing-transmission end in the multiplexed remaining time, the base station may control the corresponding sharing-transmission end to perform LBT processing on target transmission resources according to the determined type.

Optionally, in condition that the sharing-transmission end is another terminal located in the same cell as the first-transmission terminal, the base station may send an LBT processing indication to the sharing-transmission end by using target transmission resources and indicate, in the LBT processing indication, the object and type of LBT processing by the sharing-transmission end. In some examples of this embodiment, the base station may send an LBT processing indication to the sharing-transmission end through transmission resources other than target transmission resources.

In the communication method provided in this embodiment, the first-transmission terminal performs LBT processing with random backoff on target transmission resources when uplink transmission is required, determines the MCOT obtained from the LBT processing, and then sends multiplexing association information for the MCOT to the base station so that the base station determines, according to the multiplexing association information, whether the MCOT has remaining time. After determining that the MCOT has remaining time, the base station controls a sharing-transmission end to multiplex the remaining time of the MCOT. In this manner, the resources of the MCOT initiated by the first-transmission terminal can be fully utilized, thereby avoiding a waste of resources and facilitating the optimization of resource allocation.

Further, in the communication method of this embodiment, a variety of schemes are provided for the base station to determine the type of LBT processing for the sharing-transmission end so that the base station can determine the type of LBT processing in various manners.

Embodiment Five

A further description is given in this embodiment to illustrate the communication method of embodiment four. See FIG. 7.

Figure 7:
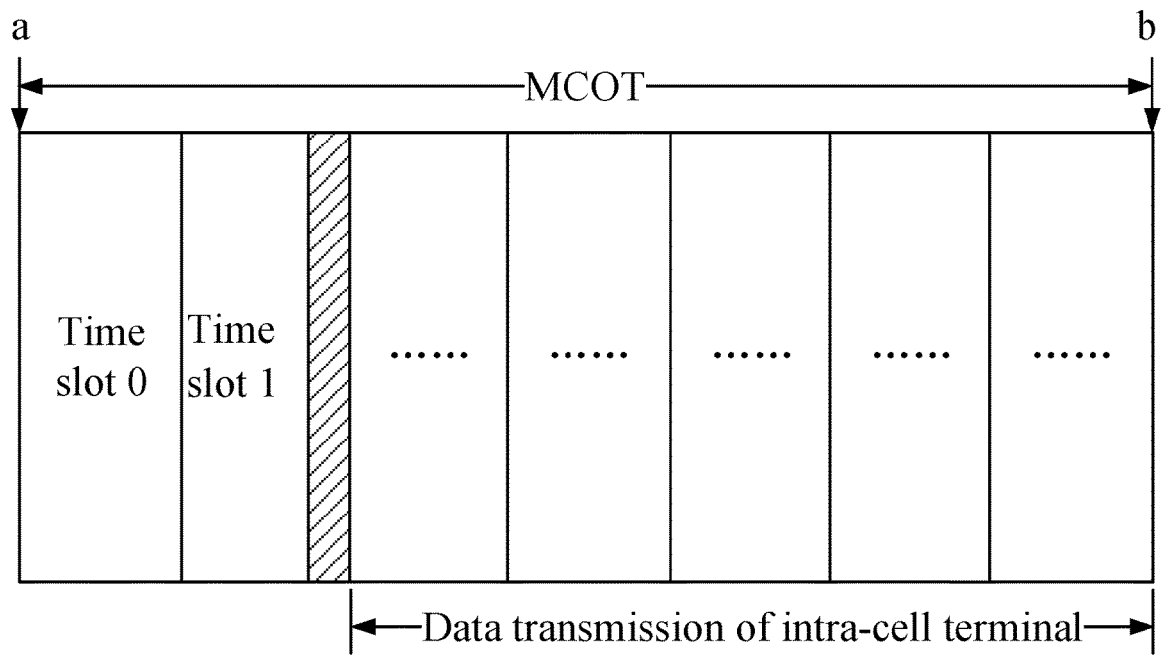
FIG. 7 is a schematic diagram illustrating that a base station controls an intra-cell terminal to multiplex the remaining time of the MCOT according to embodiment five of the present disclosure.

In FIG. 7, the first-transmission terminal performs, as indicated in RRC signaling sent by the base station, LBT processing with random backoff before uplink data transmission. The start time and end time of the MCOT initiated in the LBT processing are a and b respectively.

After the LBT processing succeeds, the first-transmission terminal may perform uplink data transmission in the MCOT. The uplink transmission here may be scheduled uplink transmission, continuously semi-persistently scheduled uplink transmission or autonomous uplink transmission. It is assumed that data transmission of the first-transmission terminal includes slot 0 and slot 1, and the first-transmission terminal sends the multiplexing association information to the base station in both slot 0 and slot 1 to indicate the number of at least one of slots or symbols remaining in the MCOT. In this case, after detecting and receiving data about slot 0 and slot 1 successfully, the base station can determine that the MCOT has remaining time and thus can enable the sharing-transmission end to multiplex the remaining time.

In this embodiment, it is assumed that the sharing-transmission end is another terminal that is located in the same cell as the first-transmission terminal and whose distance from the first-transmission terminal is less than the preset distance threshold D. For ease of description, this type of terminal is referred to as an "intra-cell terminal". The base station may trigger, through carriers or BWPs different from carriers or BWPs in target transmission resources, SPS transmission of an intra-cell terminal. Alternatively, the base station may trigger, through carriers or BWPs different from carriers or BWPs in target transmission resources, SUL transmission (scheduled uplink transmission) of an intra-cell terminal.

Of course, in some other examples of this embodiment, the base station may trigger, through carriers or BWPs in target transmission resources, SPS transmission or SUL transmission of an intra-cell terminal.

In an example of this embodiment, the base station may send an LBT processing indication to an intra-cell terminal at the first transmission symbol of slot 2 to schedule uplink data transmission of the intra-cell terminal after the corresponding type of LBT processing on target transmission resources are performed by the intra-cell terminal.

In another example of this embodiment, the base station may send an LBT processing indication to an intra-cell terminal at the last transmission symbol of slot 1 to schedule uplink data transmission of the intra-cell terminal after the corresponding type of LBT processing on target transmission resources are performed by the intra-cell terminal. In this case, the first-transmission terminal is required to vacate the last transmission symbol of slot 1 (that is, the transmission symbol corresponding to the shaded area of FIG. 7) for the intra-cell terminal to perform LBT processing.

Figure 8:
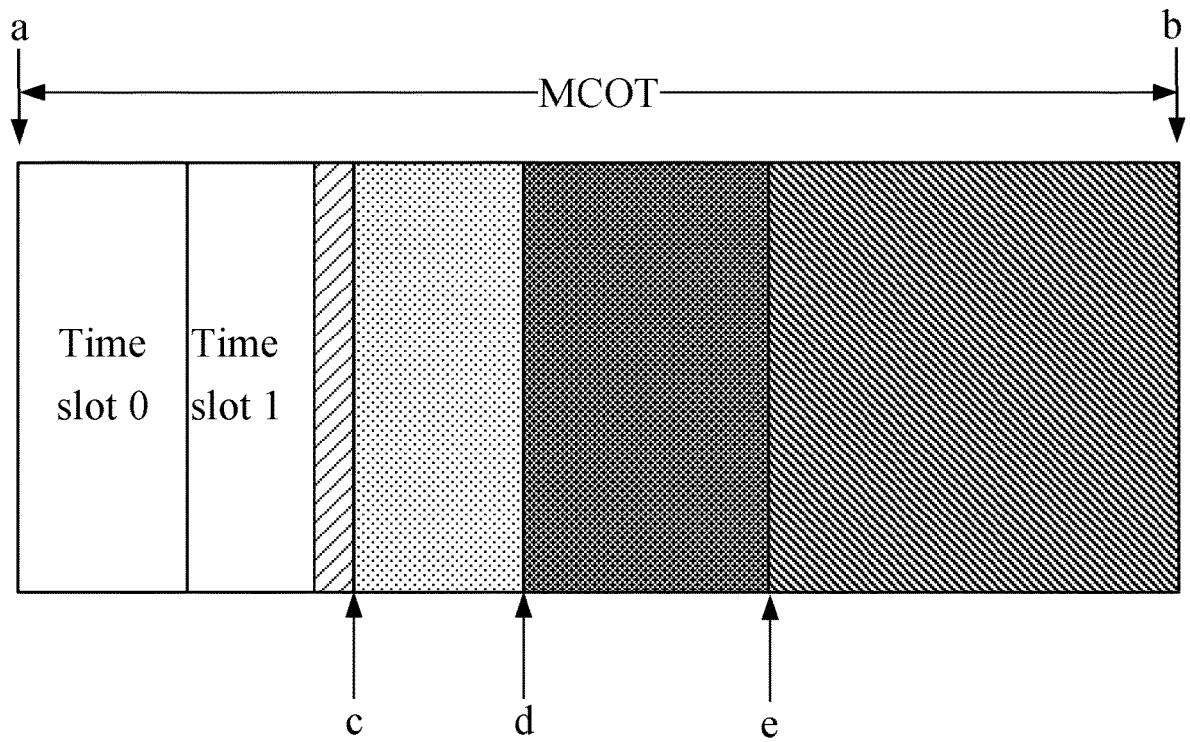
FIG. 8 is a schematic diagram illustrating that the base station controls a sharing-transmission end to multiplex the remaining time of the MCOT according to embodiment five of the present disclosure.

In some examples of this embodiment, the sharing-transmission end is the base station, and the data receiving end of downlink transmission of the base station may be the first-transmission terminal or another terminal located in the same cell as the first-transmission terminal, such as an intra-cell terminal. As shown in FIG. 8, it is similarly assumed that the start time and the end time of MCOT initiated by the first-transmission terminal are a and b respectively, data transmission of the first-transmission terminal includes slot 0 and slot 1, and the first-transmission terminal vacates the last transmission symbol of slot 1 for another sharing-transmission end to perform LBT processing. The base station may perform LBT processing at the last transmission symbol of slot 1, send downlink control information to the data receiving end at time-domain resources between, for example, time c and time d and then perform downlink data transmission from time d until time e. In the remaining time of the MCOT after time e, the data receiving end between time d and time e may perform uplink transmission again. For example, in condition that the data receiving end is the first-transmission terminal, the base station may schedule AUL retransmission of the first-transmission terminal. The downlink control information sent by the base station between time c and time d may be ACK/NACK feedback information for the first uplink transmission after the MCOT is initiated for the first-transmission terminal. In the downlink control information, the base station may feed back, in the form of a bitmap, detection and reception of CBGs or TBs transmitted for the first time.

In the communication method provided in this embodiment, one MCOT initiated by the first-transmission terminal may include two or more uplink-downlink turning points, and the base station can flexibly control, according to the remaining time of the MCOT, itself or other terminals to use the remaining time, thereby utilizing transmission resources more effectively and improving the transmission performance of the system.

Embodiment Six

The following describes, by way of example, a scheme for a base station to determine the type of LBT processing for a sharing-transmission end when the remaining time of MCOT is multiplexed.

Assuming that a terminal as a first-transmission terminal initiates an MCOT by performing type-4 LBT processing on target transmission resources and performs uplink transmission in the MCOT, but not all of the MCOT is used in the first uplink transmission of the first-transmission terminal, then the base station may enable the sharing-transmission end to multiplex the remaining time of the MCOT. The following describes several cases in which the base station determines the type of LBT for the sharing-transmission end.

Case 1: In condition that the sharing-transmission end is the first-transmission terminal, that is, in condition that the terminal that initiated the MCOT is to send uplink data in the MCOT subsequently, then the terminal may perform type-2 LBT processing on target transmission resources, or the terminal may perform type-1 LBT processing, that is, the terminal may transmit uplink data without LBT processing on target transmission resources.

Case 2: In condition that the sharing-transmission end is the base station, and the data receiving end corresponding to the downlink data transmission of the base station is the first-transmission terminal, then the base station determines that the base station may perform type-1 LBT processing or type-2 LBT processing before data transmission.

Case 3: In condition that data required to be sent in the remaining time of the MCOT is data about an intra-cell terminal, that is, the data is not related to the first-transmission terminal, then the type of LBT processing required to be performed is determined according to the time difference $\Delta t$ between the earliest transmission time of the intra-cell terminal and the first-transmission end time of the first-transmission terminal. When the time difference $\Delta t$ between the earliest transmission time and the first-transmission end time is less than or equal to a first time threshold T1 (for example, 16 us), whether the data transmitting end is the base station or is the intra-cell terminal, type-1 LBT processing may be performed, that is, data transmission may be performed without LBT processing. When $\Delta t$ is greater than T1 and less than or equal to a second time threshold T2, whether the data transmitting end is the base station or is the intra-cell terminal, type-2 LBT processing may be performed. When $\Delta t$ is greater than T2, whether the data transmitting end is the base station or is the intra-cell terminal, type-4 LBT processing may be performed.

In the preceding three cases, the base station determines the type of LBT processing for the sharing-transmission end according to whether data transmitted when the sharing-transmission end multiplexes the remaining time of the MCOT is related to the first-transmission terminal. The following describes a scheme for determining the type of LBT processing for the sharing-transmission end according to a beam direction.

Case 4: The base station determines the type of LBT processing according to the beam direction to be used in data transmission of the sharing-transmission end. When the beam direction to be used by the sharing-transmission end is the same as the beam direction used in the first uplink transmission after the first-transmission terminal initiates the MCOT, the base station determines that the sharing-transmission end may perform type-2 LBT processing. When the beam direction to be used by the sharing-transmission end is different from the beam direction used in the first uplink transmission after the first-transmission terminal initiates the MCOT, the base station determines that the sharing-transmission end is required to perform type-4 LBT processing.

In other cases, in condition that the first-transmission terminal does not indicate, for the base station through multiplexing association information, the type of LBT processing required to be performed by the sharing-transmission end, the base station may determine that the sharing-transmission end is required to perform type-4 LBT processing.

According to the communication scheme of this embodiment, the base station may determine the type of LBT processing by the sharing-transmission end according to whether the sharing-transmission end required to multiplex the MCOT is the first-transmission terminal, the size of the time difference $\Delta t$ between the start time of data transmission in the multiplexed remaining time and the end time of the first uplink transmission after the first-transmission terminal initiates the MCOT, and the relationship between beam directions used by the sharing-transmission end and the first-transmission terminal.

Embodiment Seven

Figure 9:
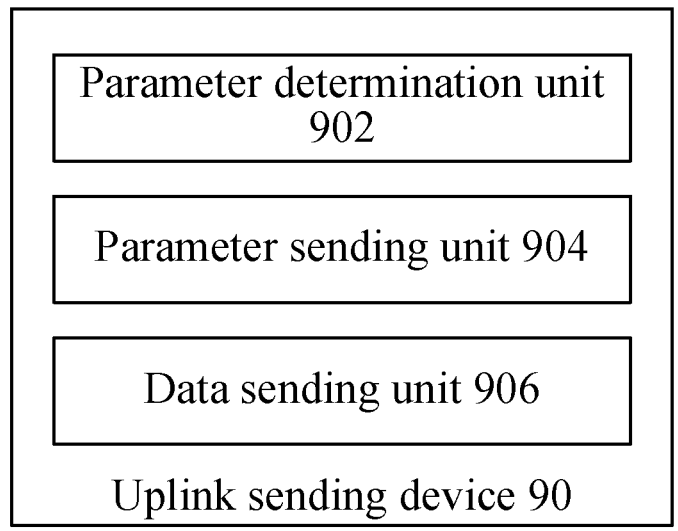
FIG. 9 is a structural diagram of an uplink transmission device according to embodiment seven of the present disclosure.

This embodiment provides an uplink transmission device. The uplink transmission device includes an uplink sending device and an uplink receiving device. The uplink sending device may be deployed in a terminal. The uplink receiving device may be deployed in a base station. The following first describes the uplink sending device. See FIG. 9.

The uplink sending device 90 includes a parameter determination unit 902, a parameter sending unit 904 and a data sending unit 906. The parameter determination unit 902 is configured to determine at least one autonomous transmission parameter for uplink transmission. The parameter sending unit 904 is configured to send the at least one autonomous transmission parameter to the base station. The data sending unit 906 is configured to send uplink data to the base station according to the at least one autonomous transmission parameter.

Figure 10:
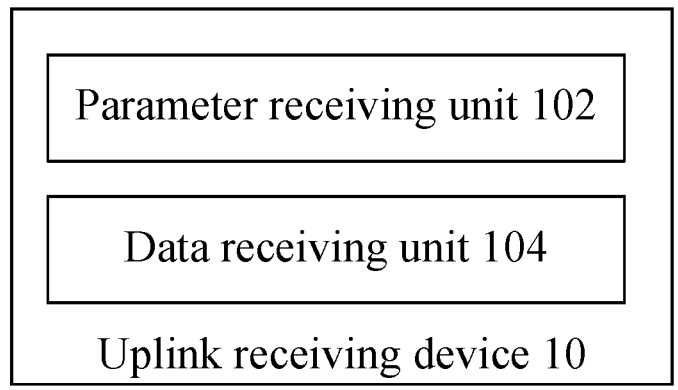
FIG. 10 is a structural diagram of an uplink receiving device according to embodiment seven of the present disclosure.

FIG. 10 is a structural diagram of the uplink receiving device.

The uplink receiving device 10 includes a parameter receiving unit 102 configured to receive at least one autonomous transmission parameter sent by the terminal and a data receiving unit 104 configured to detect and receive, according to the at least one autonomous transmission parameter, uplink data sent by the terminal.

In this embodiment, when performing uplink transmission, the data sending unit 906 of the uplink sending device 90 is not required to completely rely on the base station to configure transmission parameters and may determine at least one transmission parameter by the parameter determination unit 902. To distinguish between the one or more transmission parameters determined by the parameter determination unit 902 and the one or more transmission parameters configured by the base station, here the transmission parameters determined by the parameter determination unit 902 are referred to as autonomous transmission parameters, and the transmission parameters configured by the base station are referred to as scheduled transmission parameters. It is to be understood that like the scheduled transmission parameters configured by the base station, the autonomous transmission parameters determined by the parameter determination unit 902 are also configured to indicate the uplink data transmission of the data sending unit 906, and the autonomous transmission parameters determined by the parameter determination unit 902 are configured to indicate not only the data transmission process of the data sending unit 906 of the uplink sending device 90, but also the detection and reception process of the data sent by the base station to the data sending unit 906.

In this embodiment, the at least one autonomous transmission parameter determined by the parameter determination unit 902 includes at least one of the actual SCS for at least one slot used in the current uplink transmission, the initial transmission symbol of the current uplink transmission, or the coded block group transmission information (CBGTI) of a coded block group transmitted in the current uplink transmission. In some examples, the autonomous transmission parameters further include at least one of the end transmission symbol of the current uplink transmission or the time-domain length of the current uplink transmission. In some other examples, the at least one autonomous transmission parameter further includes at least one of the HARQ process number, the NDI or the RV information of the current uplink transmission. Optionally, in some examples, the autonomous transmission parameters determined by the parameter determination unit 902 may be a combination of all or any of the preceding parameters.

The autonomous transmission parameters that may be determined by the parameter determination unit 902 include the actual SCS. For example, the parameter determination unit 902 may determine the actual SCS for the first M slots in the current uplink transmission, where M is an integer greater than 0. Before performing uplink transmission, the data sending unit 906 may be required to perform listen-before-talk (LBT) processing on transmission resources to determine whether the corresponding transmission resources are idle and available. Only when the corresponding transmission resources are idle and available, can the data sending unit 906 use the corresponding transmission resources to transmit data. LBT processing is generally classified into LBT processing without random backoff and LBT processing with random backoff. LBT processing without random backoff includes type-1 LBT processing and type-2 LBT processing. Type-1 LBT processing means that a transmitting end does not perform LBT processing. Type-2 LBT processing means that before performing service transmission, the transmitting end senses the idleness of a to-be-used channel for a period of time (such as 9 us or 16 us). In condition that it is determined from this period of sensing that the channel is idle, data transmission can be performed. LBT processing with random backoff includes type-3 LBT processing and type-4 LBT processing. Type-3 LBT processing and type-4 LBT processing are different in that the size of a contention window (CW) is fixed in Type-3 LBT processing while the size of a contention window is not fixed in type-4 LBT processing. Except for this difference, Type-3 LBT processing and type-4 LBT processing are similar in that the transmitting end randomly acquires a value n from a contention window and uses the value n as the backoff value. Therefore, the maximum of the backoff value n does not exceed the maximum value CW of the contention window. The backoff value n can determine the number of times the transmitting end performs listening or idleness sensing during LBT processing. For LBT processing with a backoff value of n, idleness sensing is performed n+1 times. Only when it is determined from every time of the n+1 times of idleness sensing that the to-be-used channel is idle, can the LBT processing be considered successful.

When the uplink sending device 90 performs type-2 LBT processing, in condition that the result of the LBT processing is successful, then the time when LBT processing succeeds is fixed and is exactly at the start time of data transmission. However, in the case where the uplink sending device 90 performs LBT processing with random backoff, the time when LBT processing succeeds is not fixed. Therefore, in condition that the time when LBT processing on transmission resources performed by the uplink sending device 90 succeeds is not at the boundary of the slot, then according to the existing scheme, the data sending unit 906 is required to wait until the boundary of the slot before data transmission. This is not conducive to full use of resources and improvement of transmission efficiency. Therefore, in this embodiment, the parameter determination unit 902 may determine the actual SCS for the first M slots in the current uplink transmission according to the time when LBT processing succeeds. In this embodiment, two schemes are provided below for the parameter determination unit 902 to determine the actual SCS for the first M slots.

Manner one: A basic-spacing indication sent by the base station is received and a basic SCS specified by the basic-spacing indication is adjusted according to the time when LBT processing succeeds to obtain the actual SCS.

For example, the basic SCS configured by the base station for a certain BWP is 30 kHz. In this case, the length of one slot is 0.5 ms. It is assumed that the time when LBT processing on transmission resources performed by the uplink sending device 90 succeeds is 0.3 ms away from the end time of a certain slot. As shown in FIG. 2, A denotes the time when LBT processing by the uplink sending device 90 succeeds, B denotes the start time of the first slot after LBT processing succeeds with the basic SCS, and the distance between A and B is 0.3 ms. According to the existing scheme, the data sending unit 906 is required to wait 0.3 ms before sending data. During this 0.3 ms, the uplink sending device 90 may be required to send an occupancy signal all the time to occupy the transmission resource. However, according to the scheme provided in this embodiment, the parameter determination unit 902 may set the actual SCS of the first slot after LBT processing to 60 kHz. In this manner, the length of the first slot becomes 0.25 ms. In this manner, the start time of the first slot after LBT processing succeeds is at C, and the distance between A and C is only 0.05 ms. In this case, the uplink sending device 90 is only required to send an occupancy signal for 0.05 ms before sending uplink data to the base station.

In the preceding example, the parameter determination unit 902 determines the actual SCS for only the first slot in uplink transmission. However, according to the preceding description, the parameter determination unit 902 may determine the actual SCS for the first M slots. The value of M may be 1 or may be an integer greater than 1, for example, 2, 3, 4, 5 . . . .

Manner two: One candidate SCS is selected, according to the time when LBT processing succeeds, from among at least two candidate SCSs specified by the base station and used as the actual SCS. The principle of this manner of determination and the principle of manner one are similar in that the two manners are both for purposes of reducing the time used by the uplink sending device 90 to send an occupancy signal and improving transmission efficiency. However, the actual SCS finally determined by the parameter determination unit 902 is one of the candidate SCSs prespecified by the base station. For example, the SCSs provided by the base station include 30 kHz, 60 kHz and 120 kHz. In this case, the parameter determination unit 902 finally selects 60 kHz as the actual SCS for the first slot.

Optionally, the parameter determination unit 902 may combine the preceding two manners when determining the actual SCS for the first multiple slots in the current uplink transmission. For example, the terminal uses manner one to determine the actual SCS of the first slot and uses manner two to determine the actual SCS of the second slot.

It is to be understood that the actual SCS determined by the parameter determination unit 902 may also correspond to the last one or more slots in the current uplink transmission. After performing type-4 LBT processing on a certain transmission resource and initiating MCOT, the uplink sending device 90 may use, within the MCOT, the transmission resource to perform transmission. However, the end time of the MCOT may not be exactly at the boundary of the slot. In this case, it is possible in the related art that the last incomplete slot is not used for transmission or only some symbols in part of the slots can be transmitted. In contrast, in this embodiment, the parameter determination unit 902 may determine, according to the end time of the MCOT of the current uplink transmission, the actual SCS for the last N slots used in the current uplink transmission, where N is an integer greater than 0.

Similarly, the parameter determination unit 902 may also use at least one of the two manners below to determine the actual SCS for the last N slots used in the current uplink transmission.

Manner one: A basic-spacing indication sent by the base station is received and a basic SCS specified by the basic-spacing indication is adjusted according to the end time of the MCOT to obtain the actual SCS.

For example, the parameter determination unit 902 determines that there is 0.8 ms remaining between the start transmission time and the end time of the MCOT. It is assumed that the basic slot sent by the base station is 0.5 ms and the corresponding SCS is 30 kHz. As shown in FIG. 3, D indicates the end time of the MCOT, and E and F indicate the start boundary of the last slot of the MCOT and the end boundary of the last slot of the MCOT respectively. According to the existing scheme, the data sending unit 906 may use only the first slot to perform transmission. 0.3 ms in the MCOT cannot be used. In contrast, according to the uplink transmission method provided in this embodiment, the parameter determination unit 902 may adjust the actual SCS of the last slot from 30 kHz of the basic SCS to 60 kHz according to the end time of the MCOT. In this manner, the length of the last slot becomes 0.25 ms. Through adjustment, the end boundary of the last slot is changed to G and the length of the first slot is still 0.5 ms. Therefore, the data sending unit 906 can effectively use the 0.75 ms time in the MCOT to perform transmission, leaving only 0.05 ms.

Manner two: One candidate SCS is selected, according to the end time of the MCOT, from among at least two candidate SCSs specified by the base station and used as the actual SCS.

For example, the SCSs provided by the base station include 15 kHz, 30 kHz and 60 kHz. In this case, the parameter determination unit 902 finally selects 60 kHz as the actual SCS for the last slot. In some examples of this embodiment, the parameter determination unit 902 may set the SCS for each slot in the current uplink transmission to 60 kHz. In this manner, the MCOT can contain three complete slots, each having a duration of 0.25 ms and totally still having a duration of 0.75 ms.

Optionally, the parameter determination unit 902 may combine the preceding two manners when determining the actual SCS for the last multiple slots in the current uplink transmission. For example, the terminal uses manner one to determine the actual SCS of the last slot and uses manner two to determine the actual SCS of the second last slot.

According to the preceding description, the two manners in which the parameter determination unit 902 determines the actual SCS for the first M slots and the two manners in which the terminal determines the actual SCS for the last M slots are substantially the same in principle.

In the case where the time when LBT processing performed by the uplink sending device 90 succeeds is not at the boundary of the slot, the uplink sending device 90 may use the manner below to reduce the sending of an occupancy signal and improve resource utilization.

In this embodiment, the parameter determination unit 902 may determine the initial transmission symbol of uplink transmission by itself according to the time when LBT processing succeeds. For example, the parameter determination unit 902 determines to use the Kth symbol after the time when LBT processing succeeds as the initial transmission symbol, where K may be an integer greater than or equal to 1 and less than a preset threshold. Generally, to reduce the sending of an occupancy signal, the parameter determination unit 902 may set K to 1. In this manner, after LBT processing succeeds, the data sending unit 906 may start data transmission from the most recent transmission symbol.

In order for the base station to know the continuous process of the current uplink transmission, when the parameter determination unit 902 determines the initial transmission symbol of the current uplink transmission, that is, when the autonomous transmission parameters include the initial transmission symbol, the parameter determination unit 902 may determine at least one of the end transmission symbol of the current uplink transmission or the time-domain length of the current uplink transmission as autonomous transmission parameters concurrently.

According to the preceding description, the autonomous transmission parameters may further include CBGTI. That is, in this embodiment, the parameter determination unit 902 may select CBGs that are to be transmitted during the current uplink transmission. It is assumed that one TB includes four CBGs. In the case of first transmission of this TB, the parameter determination unit 902 may transmit one, multiple or all of the four CBGs and determine the CBGTI of CBGs to be transmitted during the current transmission as one of the one or more autonomous transmission parameters of the current uplink transmission. It is to be understood that the uplink transmission of the data sending unit 906 may include TB retransmission as well as the first TB transmission. For example, in condition that after the first transmission of CBG 1, CBG 2, CBG 3 and CBG 4 in a certain TB is performed, the base station reports that CBG 2 and CBG 3 fail to be detected and received, then the CBGs currently to be transmitted include CBG 2 and CBG 3 required to be retransmitted.

Assuming that currently the TB corresponding to only one HARQ process contains CBGs to be transmitted, then the parameter determination unit 902 may select one or more CBGs from among the CBGs to be transmitted in the TB and include the CBGTI of the selected CBGs in the autonomous parameters. In some examples of this embodiment, the parameter determination unit 902 may determine at least one of the HARQ process number corresponding to the TB, the new data indication (NDI) corresponding to the TB, or the redundancy version (RV) information corresponding to the TB concurrently.

Assuming that currently TBs corresponding to more than one HARQ process are required to be transmitted, then the parameter determination unit 902 may determine the HARQ process number corresponding to the current uplink transmission, select CBGs to be transmitted from among the TB corresponding to the determined HARQ process and then determine CBGTI. Of course, the parameter determination unit 902 may determine the NDI and the RV information as autonomous transmission parameters when using the CBGTI and the HARQ process number as autonomous transmission parameters. The NDI is configured to indicate whether data in a currently transmitted CBG is new data or retransmitted data. The channel-coded data of the TB includes three segments. The first segment of the channel-coded data may be considered as basic data. The remaining two segments of the channel-coded data are redundant data. The three segments of data are placed in a ring buffer in sequence. The RV information actually indicates from which position of this buffer a data receiving end fetches data. In this embodiment, each RV may be pre-agreed by the uplink sending device 90 and the base station. In each uplink transmission, the parameter determination unit 902 may determine which RV is used in the current uplink transmission, thereby autonomously determining the current RV information.

In some other examples of this embodiment, the order in which RVs are used may be pre-agreed by the base station and the uplink sending device 90. For example, the RVs include version A, version B and version C, and the base station and the uplink sending device 90 pre-agree that version B is used in the first transmission of a TB, version C is used in the second transmission of the TB and version A is used in the third transmission of the TB. In this case, the parameter determination unit 902 may transmit data by using corresponding RVs in the pre-agreed order without determining the RV information by itself.

After the parameter determination unit 902 determines the autonomous transmission parameters, the parameter sending unit 904 may send the autonomous transmission parameters to the base station so that the base station can receive uplink data from the uplink sending device 90 based on the autonomous transmission parameters. In an example of this embodiment, the parameter sending unit 904 may carry the autonomous transmission parameters in uplink control information (UCI) and send the autonomous transmission parameters to the base station. The parameter sending unit 904 may transmit the UCI by using a PUCCH or a PUSCH. When transmitting the UCI by using the PUSCH, the parameter sending unit 904 may transmit the UCI in a predefined position of a DMRS. Transmission of the autonomous transmission parameters by using the PUSCH enables a reduction in the occupation of spectrum resources in uplink transmission and an improvement in the utilization of spectrum resources.

The following describes the uplink receiving device 10 by using the base station as an example.

The parameter receiving unit 102 may receive the UCI from the position corresponding to the DMRS signal, thereby acquiring the autonomous transmission parameters indicating the detection and reception of uplink data. Then, the data receiving unit 104 detects and receives, according to the autonomous transmission parameters, uplink data sent by the data sending unit 906. In some examples of this embodiment, the autonomous transmission parameters sent by the parameter sending unit 904 to the parameter receiving unit 102 include all transmission parameters required for uplink transmission. In this case, the data receiving unit 104 may perform the detection and reception of uplink data according to the received autonomous transmission parameters. In some other examples of this embodiment, the autonomous transmission parameters determined by the parameter determination unit 902 are only part of the transmission parameters required for uplink transmission. In this case, the remaining transmission parameters may be determined by the uplink receiving device 10. For example, the uplink receiving device 10 sends the scheduled transmission parameters to the uplink sending device 90 and then the data sending unit 906 sends uplink data according to the autonomous transmission parameters and the scheduled transmission parameters. After receiving the autonomous transmission parameters sent by the parameter receiving unit 102, the parameter determination unit 902 detects and receives uplink data according to the autonomous transmission parameters and the scheduled transmission parameters.

According to the preceding description, the data sending unit 906 of the uplink sending device 90 may be required to perform LBT processing on transmission resources before performing uplink transmission. In this embodiment, transmission resources whose LBT processing is to be performed by the uplink sending device 90 may be indicated and determined by the uplink receiving device 10. For example, the uplink receiving device 10 sends an LBT processing indication to the uplink sending device 90. Each of the transmission resources here may be jointly determined by a time domain, a frequency domain and a beam direction. That is, the three parameters may determine one transmission resource, and when any one of the parameters changes, the corresponding transmission resource also changes. The LBT processing indication includes time-domain indication information, frequency-domain indication information and beam direction indication information for indicating transmission resources whose LBT processing is to be performed. In condition that the time-domain indication information, frequency-domain indication information and beam direction indication information included in the LBT processing indication sent by the uplink receiving device 10 can determine only one transmission resource, the uplink sending device 90 can directly perform LBT processing on this transmission resource. In some examples of this embodiment, the time-domain indication information, frequency-domain indication information and beam direction indication information included in the LBT processing indication may indicate at least two transmission resources concurrently. When at least two transmission resources are specified in the LBT processing indication, the uplink sending device 90 may perform LBT processing on one or more of these transmission resources and then transmit data by using at least one of transmission resources whose LBT processing is successful.

In this embodiment, the time-domain indication information may include an uplink transmission period configured for the uplink sending device 90. The uplink transmission period is determined and configured by the uplink receiving device 10. In an example of this embodiment, in condition that the time-domain indication information includes only the uplink transmission period, as long as the terminal is in the uplink transmission period and the uplink sending device 90 currently is required to send data to the uplink receiving device 10, it is feasible to perform LBT processing on transmission resources and transmit data after the LBT processing succeeds.

In another example of this embodiment, the time-domain indication information includes not only the uplink transmission period configured by the uplink receiving device 10 for the uplink sending device 90, but also a slot opportunity indication configured to indicate whether each slot in the uplink transmission period allows autonomous uplink transmission. For example, the slot opportunity indication for the uplink transmission period is presented in the form of a bitmap. Each data bit in the bitmap corresponds to the respective slot in the uplink transmission period. In condition that the uplink receiving device 10 allows the uplink sending device 90 to perform uplink transmission in a certain slot, the data bit corresponding to the slot is "0"; otherwise, the data bit corresponding to the slot is "1". In condition that uplink transmission period t1-t2 indicated by the uplink receiving device 10 contains five slots and the bitmap corresponding to the uplink transmission period is "01001", then the uplink receiving device 10 allows the uplink sending device 90 to perform uplink transmission in slots 1, 3 and 4 while the terminal has no uplink transmission opportunity in slots 2 and 5. In such scheme, when the uplink sending device 90 has uplink data to be sent, the uplink sending device 90 is required to perform LBT processing in a slot selected from within the uplink transmission period according to the time-slot opportunity indication in response to presence of the to-be-transmitted uplink data, and then to transmit data after the LBT processing succeeds.

The frequency-domain indication information includes at least one uplink transmission frequency band configured by the uplink receiving device 10 for the uplink sending device 90 and a frequency band opportunity indication configured to indicate whether an uplink transmission frequency band allows uplink autonomous transmission. Similar to the preceding second type of time-domain indication information, such frequency-domain indication information is configured to instruct the uplink sending device 90 to select a frequency-domain position from within each uplink transmission frequency band according to the frequency band opportunity indication when the uplink sending device 90 has uplink data to be sent, to determine, according to the selected frequency-domain position, transmission resources whose LBT processing is to be performed, and then to perform LBT processing on the transmission resources.

In an example of this embodiment, the frequency band opportunity indication may also be presented in the form of a bitmap. For example, each uplink transmission frequency band corresponds to the respective data bit in the bitmap. In condition that a frequency-domain position is available in an uplink transmission frequency band for the uplink sending device 90 to perform uplink transmission, the value of the bitmap data bit corresponding to the uplink transmission frequency band indicates yes; otherwise, the value of the bitmap data bit corresponding to the uplink transmission frequency band indicates no. For example, the uplink receiving device 10 indicates two interleaving units for the uplink sending device 90, namely interleaving unit A and interleaving unit B, then two data bits are present in the bitmap, where "0" indicates yes and "1" indicates no. One interleaving unit contains equally spaced M RBs or N REs. M and N are numerical values related to the BWP size or the system bandwidth. In this embodiment, to reduce signaling overhead, the uplink receiving device 10 specifies the same available frequency-domain positions in each uplink transmission frequency band. Assuming that available frequency-domain positions in interleaving unit A are subcarriers 1, 3, 5 and 7, then available frequency-domain positions in interleaving unit B are also subcarriers 1, 3, 5 and 7. Thus, in condition that each uplink transmission frequency band specified by the uplink receiving device 10 has the same frequency-domain positions, the uplink sending device 90 can determine available frequency-domain positions in each uplink transmission frequency band simply after the uplink receiving device 10 specifies available frequency-domain positions in one uplink transmission frequency band.

In some examples of this embodiment, the beam direction information may be determined by spatial parameter information in SRS resource configuration. One set of SRS spatial parameters corresponds to one beam direction. In some examples of this embodiment, one piece of beam direction information may include one SRS resource set. One SRS resource set includes at least two SRSs. Each SRS corresponds to a different beam direction.

When the uplink sending device 90 provided in this embodiment is deployed in the terminal, the functions of the parameter determination unit 902 may be implemented by the first processor of the terminal, and the functions of the parameter sending unit 904 and the functions of the data sending unit 906 may be both implemented by the first communication device under the control of the first processor of the terminal.

When the uplink receiving device 10 in this embodiment is deployed in the base station, the functions of the parameter receiving unit 102 and the functions of the data receiving unit 104 may be both implemented by the second communication device of the base station under the control of the second processor of the base station.

In the uplink sending device and uplink receiving device provided in this embodiment of the present disclosure, the uplink sending device determines one or more autonomous transmission parameters by itself, sends the determined transmission parameters to the uplink receiving device, and then performs uplink data transmission with the uplink receiving device based on these autonomous transmission parameters. In this manner, the uplink sending device can determine the transmission policy flexibly according to, for example, the current transmission environment without blindly performing transmission according to the indication of the uplink receiving device, thereby improving the flexibility of autonomous uplink transmission of the uplink sending device and facilitating the improvement of the transmission efficiency and the utilization of transmission resources.

Embodiment Eight

This embodiment provides a communication device. The communication device may be a first communication device or a second communication device. The first communication device is deployed, as a first-transmission terminal, on a terminal. The second communication device may be deployed on a base station. The following describes the structure of the first communication device and the structure of the second communication device with reference to FIGS. 11 and 12.

Figure 11:
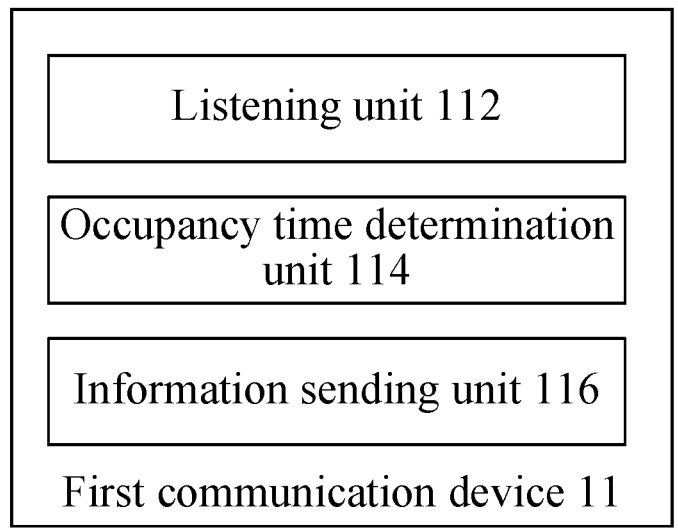
FIG. 11 is a structural diagram of a first communication device according to embodiment eight of the present disclosure.

Referring to FIG. 11, the first communication device 11 includes a listening unit 112, an occupancy time determination unit 114 and an information sending unit 116. The listening unit 112 is configured to perform LBT processing with random backoff on target transmission resources when uplink transmission is required. The occupancy time determination unit 114 is configured to determine the MCOT obtained from the LBT processing. The information sending unit 116 is configured to send multiplexing association information for the MCOT to a base station so that the base station controls, according to the multiplexing association information, a sharing-transmission end to multiplex the remaining time of the MCOT after the uplink transmission is completed.

Figure 12:
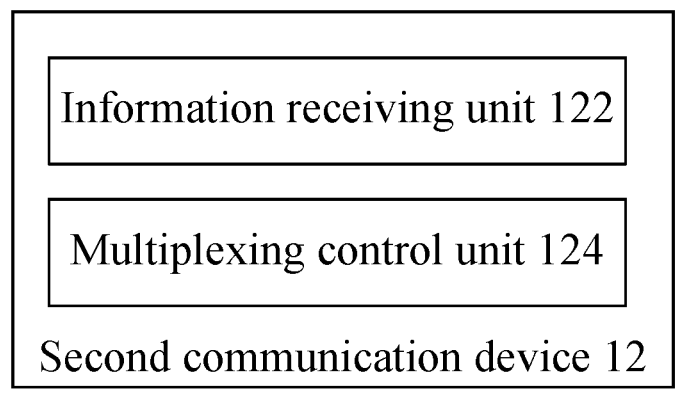
FIG. 12 is a structural diagram of a second communication device according to embodiment eight of the present disclosure.

Referring to FIG. 12, the second communication device 12 includes an information receiving unit 122 and a multiplexing control unit 124. The information receiving unit 122 is configured to receive multiplexing association information sent by a first-transmission terminal for MCOT. The multiplexing control unit 124 is configured to, after it is determined, according to the multiplexing association information, that the MCOT still has remaining time after uplink transmission of the first-transmission terminal is completed, control the sharing-transmission end to multiplex the remaining time.

In this embodiment, the LBT processing on the transmission resources may be performed by the listening unit 112 according to the LBT indication of the second communication device 12. According to the preceding embodiment, the second communication device 12 may specify, in the LBT indication, for example, RRC signaling, multiple candidate transmission resources for the terminal, and the listening unit 112 may perform LBT processing on some or all of the candidate transmission resources and then select at least one of transmission resources whose LBT processing is successful as the target transmission resource. In other examples of this embodiment, the listening unit 112 may select only one of the candidate transmission resources and perform LBT processing on the selected candidate transmission resource. In condition that the LBT processing succeeds, this transmission resource is used as the target transmission resource. In condition that the LBT processing fails, no target transmission resource is available temporarily and data transmission is not performed.

It can be seen that a transmission resource on which LBT processing is performed by the listening unit 112 is not necessarily a target transmission resource, but a target transmission resource is necessarily to be an object on which the LBT processing is performed by the listening unit 112.

Although LBT processing with random backoff is performed on the target transmission resources, the MCOT varies with different LBT processing processes. In some examples of this embodiment, the size of the MCOT is related to the size of the random-backoff value of performed LBT processing with random backoff or related to the size of the contention window of performed type-4 LBT processing. Therefore, after LBT processing succeeds, the occupancy time determination unit 114 can determine the size of the MCOT obtained in the current LBT processing.

Then, the information sending unit 116 sends the multiplexing association information for the MCOT to the second communication device 12. The multiplexing association information at least enables the second communication device 12 to determine whether the MCOT has, after the current uplink transmission of the first communication device 11 is completed, remaining time for data transmission of the sharing-transmission end.

Further, in some examples of this embodiment, the multiplexing association information not only enables the second communication device 12 to determine whether the current MCOT has remaining time for data transmission of the sharing-transmission end, but also enables, when the second communication device 12 determines that remaining time is available, the second communication device 12 to determine which type of LBT processing by the sharing-transmission end should target transmission resources receive.

For example, in an example of this embodiment, the information sending unit 116 may send first information indicating the end time of the MCOT to the second communication device 12 and use the first information as the multiplexing association information. In this manner, after receiving the first information, the second communication device 12 can determine, according to the current time, whether the subsequent time belongs to the MCOT.

For example, the first information may be the number of at least one of slots or symbols currently remaining in the MCOT. In some cases, the first information includes only the number of slots currently remaining in the MCOT. For example, when three complete slots and two symbols remain in the MCOT, the information sending unit 116 notifies the second communication device 12 that four slots remain currently. Of course, in this case, the information sending unit 116 may also convert the remaining actual time into the number of remaining symbols and feed back the number of remaining symbols to the second communication device 12. For example, the first information of the information sending unit 116 indicates that 23 symbols remain in the MCOT. In some cases, the first information includes only the number of symbols currently remaining in the MCOT. For example, when only five symbols remain in the MCOT, the information sending unit 116 notifies the second communication device 12 that five symbols remain currently. Similarly, in this case, the information sending unit 116 may convert the remaining actual time into the number of remaining slots and feed back the number of remaining slots. For example, the first information sent by the information sending unit 116 to the second communication device 12 indicates that five or seven slots remain in the MCOT. Optionally, in these two cases, the information sending unit 116 may also combine the preceding two types of first information and indicate the combined information for the second communication device 12. For example, when at least one complete slot remains in the MCOT, the information sending unit 116 indicates only the number of remaining slots for the second communication device 12; when less than one complete slot remains in the MCOT, the information sending unit 116 indicates the number of remaining symbols for the second communication device 12.

In other examples, the information sending unit 116 may know the feedback time configured by the second communication device 12 for the current uplink transmission. Since the feedback time is also known by the second communication device 12, the information sending unit 116 may indicate the location of the feedback time in the MCOT for the second communication device 12 and send this location to the second communication device 12, with this location used as the first information. In this manner, the second communication device 12 can determine the end time of the MCOT based on the feedback time configured by itself, thereby determining how much time currently remains before the end of the MCOT.

Optionally, the first information may include the position of the feedback time in the MCOT in addition to at least one of the number of at least one of slots or symbols currently remaining in the MCOT.

In an example of this embodiment, the information sending unit 116 may use, as the multiplexing association information, type information for indicating LBT processing performed when the sharing-transmission end multiplexes the remaining time and then send the second communication device 12 the multiplexing association information. In this manner, after receiving the multiplexing association information, the second communication device 12 can determine the type of LBT processing on target transmission resources by the sharing-transmission end simply by parsing the multiplexing association information instead of determining the type of LBT processing according to the remaining time of the MCOT.

It is to be understood that it is also feasible that the multiplexing association information includes both the first information and the type information for indicating, for the second communication device 12 by the information sending unit 116, LBT processing performed when the sharing-transmission end multiplexes the remaining time. In some examples of this embodiment, the information sending unit 116 may send the multiplexing association information to the second communication device 12 in one or part of the slots of the uplink transmission of the first communication device 11. However, to avoid the problem in which the second communication device 12 cannot know the end time of the MCOT and cannot determine whether the MCOT has remaining time due to unsuccessful detection of reception, in some examples of this embodiment, the information sending unit 116 may send the multiplexing association information to the second communication device 12 in each slot of the uplink transmission.

After the information receiving unit 122 of the second communication device 12 receives the multiplexing association information sent by the first communication device 11, the multiplexing control unit 124 may determine, according to the multiplexing association information, whether the MCOT still has remaining time when the current uplink transmission of the first communication device 11 is completed. In condition that the determination result is yes, the multiplexing control unit 124 may control the sharing-transmission end to multiplex the remaining time. In this embodiment, the sharing-transmission end may be the first communication device 11, the second communication device 12, or a terminal located in the same cell as the first communication device 11, especially a terminal relatively close to the first communication device 11, for example, a terminal less than the preset distance threshold away from the first communication device 11.

In this embodiment, the multiplexing control unit 124 may determine, according to at least one of the multiplexing association information, information about a transmitting end and a receiving end, or a beam relationship, the type of LBT processing required to be performed when the remaining time is multiplexed. As described earlier, the multiplexing association information may indicate the type of LBT processing performed when the sharing-transmission end multiplexes the remaining time. Therefore, in this case, after the information receiving unit 122 receives and parses the multiplexing association information, the multiplexing control unit 124 can determine what type of LBT processing is to be performed by the sharing-transmission end.

The following describes a scheme for the multiplexing control unit 124 to determine, according to the information about the transmitting end and the receiving end, the type of LBT processing for the sharing-transmission end.

The "information about the transmitting end and the receiving end" here refers to whether data transmitted by the sharing-transmission end in the multiplexed remaining time is related to the first communication device 11. For example, in condition that the transmitting end or the receiving end of the data transmitted in the multiplexed remaining time is the first communication device 11, the data transmitted in the remaining time is related to the first communication device 11; otherwise, the data transmitted in the remaining time is not related to the first communication device 11. For example, data is sent by the second communication device 12 to another terminal in the same cell or sent by another terminal in the same cell to the second communication device 12. In both of the two cases, data transmission is not related to the first communication device 11.

In condition that the information about the transmitting end and the receiving end indicates that data to be transmitted by the sharing-transmission end is related to the first communication device 11, the multiplexing control unit 124 determines that the sharing-transmission end may perform LBT processing without random backoff. According to embodiment one, LBT processing without random backoff includes type-1 LBT processing and type-2 LBT processing. That is, when multiplexing the remaining time of the MCOT, the sharing-transmission end may not perform LBT on target transmission resources or may perform t ms sensing.

It is to be understood that data transmitted in the remaining time may be related to the first communication device 11 in two cases. One is that the first communication device 11 serves as the sharing-transmission end. The other is that the second communication device 12 serves as the sharing-transmission end and sends data to the first communication device 11. In the first case, the first communication device 11 may perform scheduled uplink transmission, continuously semi-persistently scheduled uplink transmission or autonomous uplink transmission. Moreover, in condition that data transmission performed by the first communication device 11 during the remaining time is continuous with data transmission performed by the first communication device 11 when the MCOT is initiated, that is, there is no turning point between uplink and downlink, the first communication device 11 may perform type-1 LBT processing.

In condition that the information about the transmitting end and the receiving end indicates that data to be transmitted by the sharing-transmission end is not related to the first communication device 11, the multiplexing control unit 124 may determine, according to the time difference $\Delta t$ between the earliest transmission time of the sharing-transmission end and the first-transmission end time of the first communication device 11, the type of LBT processing required to be performed. The first-transmission end time here is the end time of the first uplink transmission after the first communication device 11 initiates the MCOT. The earliest transmission time here is the earliest time when the sharing-transmission end is allowed to transmit in the remaining time of the MCOT. The earliest transmission time is determined based on type-1 LBT processing performed by the sharing-transmission end. That is, the earliest transmission time is the earliest transmission time allowed when it is assumed that the sharing-transmission end does not perform LBT in the remaining time.

For example, in condition that the time difference $\Delta t$ is less than or equal to a first time threshold, it is determined that the sharing-transmission end requires to perform type-1 LBT processing; in condition that the time difference $\Delta t$ is greater than the first time threshold and less than a second time threshold, it is determined that the sharing-transmission end requires to perform type-2 LBT processing; and in condition that the time difference $\Delta t$ is greater than the second time threshold, it is determined by the multiplexing control unit 124 that the sharing-transmission end requires to perform LBT processing with random backoff, for example, type-4 LBT processing. The first time threshold and the second time threshold here may be two predefined values.

The following describes a scheme for the multiplexing control unit 124 to determine, according to the beam relationship, the type of LBT processing for the sharing-transmission end.

The "beam relationship" is between the beam direction used by the sharing-transmission end and the first-transmission beam direction of the first communication device 11. The first-transmission beam direction is used in the first uplink transmission after the first communication device 11 initiates the MCOT. The beam direction used by the sharing-transmission end and the first-transmission beam direction may be the same or different. Optionally, in condition that the sharing-transmission end and the first communication device 11 use the same beam direction in the first uplink transmission, the multiplexing control unit 124 may determine that the sharing-transmission end performs type-2 LBT processing; in condition that the beam direction used by the sharing-transmission end is different from the first-transmission beam direction used in the first uplink transmission after the first communication device 11 initiates the MCOT, then the multiplexing control unit 124 may determine that the sharing-transmission end performs LBT processing with random backoff, that is, type-3 or type-4 processing.

After determining the type of LBT processing to be performed for data transmission to be performed by the sharing-transmission end in the multiplexed remaining time, the second communication device 12 may control the corresponding sharing-transmission end to perform LBT processing on target transmission resources according to the determined type.

Optionally, in condition that the sharing-transmission end is another terminal located in the same cell as the first communication device 11, the multiplexing control unit 124 may send an LBT processing indication to the sharing-transmission end by using target transmission resources and indicate, in the LBT processing indication, the object and type of LBT processing by the sharing-transmission end. In some examples of this embodiment, the multiplexing control unit 124 may send an LBT processing indication to the sharing-transmission end through transmission resources other than target transmission resources.

In the first communication device and the second communication device provided in this embodiment, the first communication device performs LBT processing with random backoff on target transmission resources when uplink transmission is required, determines the MCOT obtained from the LBT processing, and then sends multiplexing association information for the MCOT to the second communication device so that the second communication device determines, according to the multiplexing association information, whether the MCOT has remaining time. After determining that the MCOT has remaining time, the second communication device controls a sharing-transmission end to multiplex the remaining time of the MCOT. In this manner, the resources of the MCOT initiated by the first communication device can be fully utilized, thereby avoiding a waste of resources and facilitating the optimization of resource allocation.

Embodiment Nine

This embodiment provides a storage medium. The storage medium may store one or more computer programs that can be read, compiled and executed by one or more processors. In this embodiment, the storage medium may store at least one of a first uplink transmission program, a second uplink transmission program, a first communication program or a second communication program. The first uplink transmission program can be used by one or more processors to execute the steps that are performed by the terminal in the uplink transmission method of any one of embodiments one to three. The second uplink transmission program can be used by the one or more processors to execute the steps that are performed by the base station in the uplink transmission method of any one of embodiments one to three. The first communication program can be used by the one or more processors to execute the steps that are performed by the first-transmission terminal in the communication method of any one of embodiments four to six. The second communication program can be used by the one or more processors to execute the steps that are performed by the base station in the communication method of any one of embodiments four to six.

Figure 13:
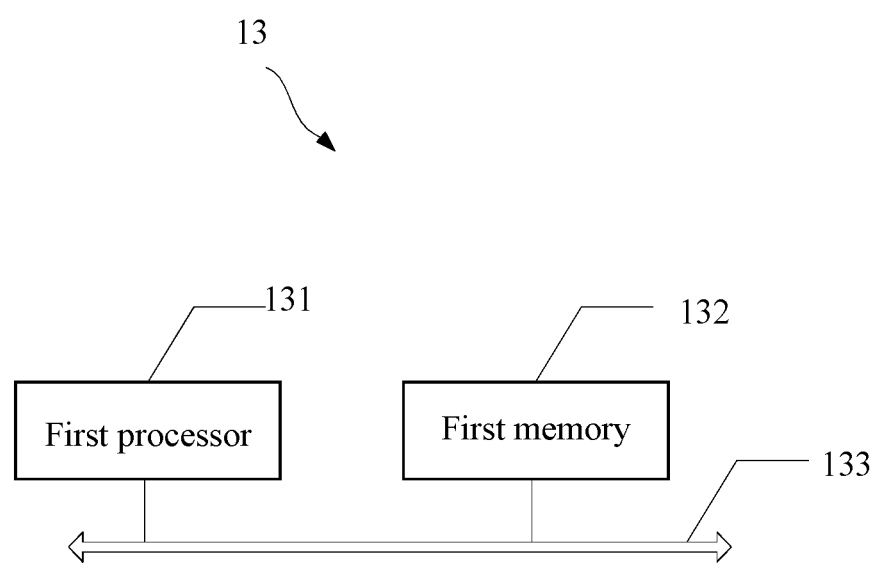
FIG. 13 is a structural diagram illustrating the hardware of a terminal according to embodiment nine of the present disclosure.

This embodiment further provides a terminal. FIG. 13 is a structural diagram illustrating the hardware of the terminal.

The terminal 13 includes a first processor 131, a first memory 132, and a first communication bus 133 for connecting the first processor 131 and the first memory 132. The first memory 132 may be the preceding storage medium storing the first uplink transmission program. The first processor 131 may read, compile and execute the first uplink transmission program stored in the first memory 132 to execute the steps that are performed by the terminal in the uplink transmission method of any one of embodiments one to three. Alternatively, the first memory 132 may be the preceding storage medium storing the first communication program. The first processor 131 may read, compile and execute the first communication program stored in the first memory 132 to execute the steps that are performed by the terminal in the communication method of any one of embodiments four to six. For details about how the terminal 13 performs the uplink transmission method of any one of embodiments one to three and details about how the terminal 13 performs the communication method of any one of embodiments four to six, see the description of the preceding embodiments. The details are not repeated here.

Figure 14:
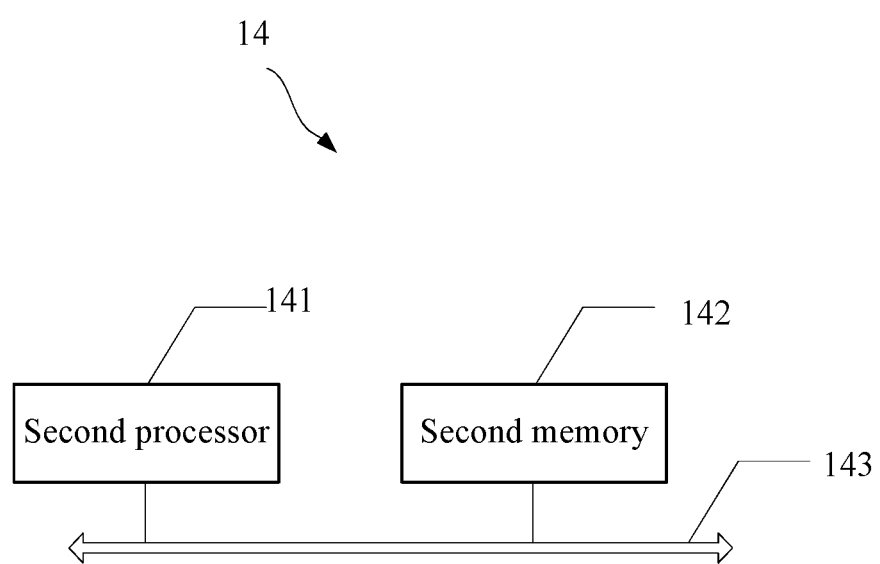
FIG. 14 is a structural diagram illustrating the hardware of a base station according to embodiment nine of the present disclosure.

This embodiment further provides a base station. FIG. 14 is a structural diagram illustrating the hardware of the base station.

The base station 14 includes a second processor 141, a second memory 142, and a second communication bus 143 for connecting the second processor 141 and the second memory 142. The second memory 142 may be the preceding storage medium storing the second uplink transmission program. The second processor 141 may read, compile and execute the second uplink transmission program stored in the second memory 142 to execute the steps that are performed by the base station in the uplink transmission method of any one of embodiments one to three. Alternatively, the second memory 142 may be the preceding storage medium storing the second communication program. The second processor 141 may read, compile and execute the second communication program stored in the second memory 142 to execute the steps that are performed by the base station in the communication method of any one of embodiments four to six. For details about how the base station 14 performs the uplink transmission method of any one of embodiments one to three and details about how the base station 14 performs the communication method of any one of embodiments four to six, see the description of the preceding embodiments. The details are not repeated here.

In the terminal, base station and storage medium provided in this embodiment, the terminal can flexibly transmit data according to currently available transmission resources without having to passively and rigidly wait until the transmission resources satisfy the scheduling requirements of the base station before performing transmission, thereby greatly enhancing the transmission flexibility of the terminal and improving the transmission efficiency of the system and the utilization of the transmission resources. Moreover, after determining that the MCOT initiated by the terminal has remaining time, the base station can control a sharing-transmission end to multiplex the remaining time of the MCOT. In this manner, the resources of the MCOT initiated by the terminal can be fully utilized, thereby avoiding a waste of resources and facilitating the optimization of resource allocation.

It is to be understood by those skilled in the art that the uplink transmission and communication methods and devices, base station, terminal and storage medium provided in embodiments of the present disclosure are applicable not only to 5G communication systems, but also to any future communication system.

Apparently, it is to be understood by those skilled in the art that the modules or steps of embodiments of the present disclosure may be implemented by at least one general-purpose computing device and may be concentrated on a single computing device or distributed in a network formed by multiple computing devices. Optionally, these modules or steps may be implemented by program codes executable by the at least one computing device. Thus, these modules or steps may be stored in a computer storage medium (such as a ROM/RAM, a magnetic disk or an optical disk) and executed by the at least one computing device. Moreover, in some cases, the illustrated or described steps may be executed in a sequence different from the sequence described herein. Alternatively, each of these modules or steps may be implemented by being made into an integrated circuit module or multiple ones of these modules or steps may be implemented by being made into a single integrated circuit module. In this manner, the present disclosure is not limited to any specific combination of hardware and software.

The preceding is a more detailed description of embodiments of the present disclosure in conjunction with implementations. The description is not intended to limit embodiments of the present disclosure. For those of ordinary skill in the art to which the present disclosure pertains, a number of simple deductions or substitutions not departing from the concept of the present disclosure may be made and should fall within the scope of the present disclosure.

What is claimed is:

1. An uplink transmission method based on an autonomous transmission parameter, comprising:
   determining at least one autonomous transmission parameter for uplink transmission, wherein the at least one autonomous transmission parameter is configured to indicate detection and reception of current uplink transmission;
   sending the at least one autonomous transmission parameter to a base station;
   sending uplink data to the base station according to the at least one autonomous transmission parameter; and
   before determining the at least one autonomous transmission parameter for the uplink transmission, the method further comprises:
   receiving a listen-before-talk (LBT) processing indication sent by the base station, wherein the LBT processing indication comprises time-domain indication information, frequency-domain indication information and beam direction information for indicating at least two transmission resources; and
   performing LBT processing on at least one of the at least two transmission resources according to the LBT processing indication and selecting, from among transmission resources whose the LBT processing is successful, at least one transmission resource for the current uplink transmission.

2. The uplink transmission method of claim 1, wherein the at least one autonomous transmission parameter comprises at least one of an actual subcarrier spacing (SCS) for at least one slot used in the current uplink transmission, an initial transmission symbol of the current uplink transmission, coded block group transmission information (CBGTI) transmitted in the current uplink transmission, or a number of at least one of slots or symbols currently remaining in maximum channel occupancy time (MCOT).

3. The uplink transmission method of claim 2, wherein in response to the at least one autonomous transmission parameter comprising the initial transmission symbol, determining the initial transmission symbol comprises determining the initial transmission symbol according to time when the LBT processing succeeds.

4. The uplink transmission method of claim 3, wherein determining the initial transmission symbol according to the time when the LBT processing succeeds comprises determining a Kth symbol after the time when the LBT processing succeeds as the initial transmission symbol, wherein K is an integer greater than or equal to 1 and less than a preset threshold;
   wherein K is 1, and the at least one autonomous transmission parameter further comprises at least one of an end transmission symbol of the current uplink transmission or a time-domain length of the current uplink transmission.

5. An uplink transmission method, comprising:
   receiving at least one autonomous transmission parameter sent by a terminal, wherein the at least one autonomous transmission parameter is determined by the terminal and configured to indicate detection and reception of current uplink transmission; detecting and receiving, according to the at least one autonomous transmission parameter, uplink data sent by the terminal; and
   before receiving the at least one autonomous transmission parameter sent by the terminal, the method further comprising: sending a listen-before-talk (LBT) processing indication to the terminal, wherein the LBT processing indication comprises time-domain indication information, frequency-domain indication information and beam direction information for indicating at least two transmission resources;
   wherein the beam direction information is determined according to a spatial parameter in a channel sounding reference signal (SRS) resource configuration.

6. The uplink transmission method of claim 5, wherein the time-domain indication information comprises an uplink transmission period configured for the terminal, and the time-domain indication information is configured to instruct the terminal to perform LBT processing immediately as long as to-be-transmitted uplink data is present in the uplink transmission period; or
   the time-domain indication information comprises the uplink transmission period configured for the terminal and a time-slot opportunity indication for indicating whether autonomous uplink transmission is allowed in each slot in the uplink transmission period, and the time-domain indication information is configured to instruct the terminal to perform LBT processing in a slot selected from within the uplink transmission period according to the time-slot opportunity indication in response to presence of the to-be-transmitted uplink data.

7. The uplink transmission method of claim 5, wherein the frequency-domain indication information comprises at least one uplink transmission frequency band configured for the terminal and a frequency-band opportunity indication for indicating whether uplink autonomous transmission is allowed in the at least one uplink transmission frequency band, and the frequency-domain indication information is configured to instruct the terminal to perform LBT processing at a frequency-domain position selected from within the at least one uplink transmission frequency band according to the frequency-band opportunity indication in response to presence of to-be-transmitted uplink data.

8. A communication method based on maximum channel occupancy time, comprising:
performing listen-before-talk (LBT) processing with random backoff for target transmission resources when uplink transmission is required;
determining the maximum channel occupancy time (MCOT) obtained from the LBT processing; and
sending sharing information for the MCOT to a base station so that the base station multiplexes, according to the sharing information, remaining time of the MCOT after the uplink transmission is completed;
wherein the sending the sharing information for the MCOT to the base station comprises at least one of: sending, to the base station, first information for indicating end time of the MCOT, or sending, to the base station, type information for indicating LBT processing performed when a sharing-transmission end multiplexes the remaining time;
wherein sending the type information for indicating the LBT processing performed when the sharing-transmission end multiplexes the remaining time comprises:
determining, according to at least one of the sharing information, information about a transmitting end and a receiving end, or a beam relationship, a type of the LBT processing required to be performed when the remaining time is multiplexed, wherein the information about the transmitting end and the receiving end is configured to indicate whether data transmitted by the sharing-transmission end by using the remaining time is related to a first-transmission terminal, and the beam relationship is between a beam direction used by the sharing-transmission end and a first-transmission beam direction of the first-transmission terminal, wherein the first-transmission beam direction is used in first uplink transmission after the first-transmission terminal initiates the MCOT.

9. The communication method of claim 8, wherein:
in a case where sending, to the base station, the first information for indicating the end time of the MCOT, the first information serves as the sharing information;
in a case where sending, to the base station, the type information for indicating the LBT processing performed when the sharing-transmission end multiplexes the remaining time, the type information serves as the sharing information; or
in a case where sending, to the base station, the first information for indicating the end time of the MCOT and the type information for indicating the LBT processing performed when the sharing-transmission end multiplexes the remaining time, the first information and the type information serve as the sharing information.

10. The communication method of claim 9, wherein the first information comprises at least one of:
a number of at least one of slots or symbols currently remaining in the MCOT; or
a position of feedback time in the MCOT, wherein the position of the feedback time is configured by the base station for the uplink transmission.

11. The communication method of claim 8, wherein in response to the sharing information comprising the type information for indicating the LBT processing performed when the sharing-transmission end multiplexes the remaining time, parsing, by the base station, the sharing information to determine the type of the LBT processing specified by a terminal.

12. The communication method of claim 8, wherein determining, according to the information about the transmitting end and the receiving end, the type of the LBT processing required to be performed when the remaining time is multiplexed comprises:
in response to the information about the transmitting end and the receiving end indicating that the data to be transmitted by the sharing-transmission end is related to the first-transmission terminal, determining that the sharing-transmission end requires to perform LBT processing without random backoff; and
in response to the information about the transmitting end and the receiving end indicating that the data to be transmitted by the sharing-transmission end is not related to the first-transmission terminal, determining, according to a time difference $\Delta t$ between earliest transmission time of the sharing-transmission end and first-transmission end time of the first-transmission terminal, the type of the LBT processing required to be performed, wherein the earliest transmission time is earliest time at which transmission is allowed after it is assumed that the sharing-transmission end performs type-1 LBT processing on the target transmission resources in the remaining time, and the first-transmission end time is end time of the first uplink transmission after the first-transmission terminal initiates the MCOT.

13. The communication method of claim 12, wherein determining, according to the time difference $\Delta t$ between the earliest transmission time of the sharing-transmission end and the first-transmission end time of the first-transmission terminal, the type of the LBT processing required to be performed comprises:
in response to the time difference $\Delta t$ being less than or equal to a first time threshold, determining that the sharing-transmission end requires to perform the type-1 LBT processing;
in response to the time difference $\Delta t$ being greater than the first time threshold and less than a second time threshold, determining that the sharing-transmission end requires to perform type-2 LBT processing; and
in response to the time difference $\Delta t$ being greater than the second time threshold, determining that the sharing-transmission end requires to perform the LBT processing with random backoff.

14. The communication method of claim 8, wherein determining, according to the beam relationship, the type of the LBT processing required to be performed when the remaining time is multiplexed comprises:
in response to the beam direction used by the sharing-transmission end being the same as the first-transmission beam direction of the first-transmission terminal, determining that the sharing-transmission end requires to perform type-2 LBT processing; and in response to the beam direction used by the sharing-transmission end being different from the first-transmission beam direction of the first-transmission terminal, determining that the sharing-transmission end requires to perform the LBT processing with random backoff.

15. A terminal, comprising a processor, a memory and a communication bus; wherein the communication bus is configured to implement connection and communication between the processor and the memory; and the processor is configured to execute instructions stored in the memory to perform the steps of the method of claim 1.

16. A base station, comprising a processor, a memory and a communication bus;

wherein the communication bus is configured to implement connection and communication between the processor and the memory; and the processor is configured to execute instructions stored in the memory to perform the steps of the method of claim 5.

17. A terminal, comprising a processor, a memory and a communication bus; wherein the communication bus is configured to implement connection and communication between the processor and the memory; and the processor is configured to execute instructions stored in the memory to perform the steps of the method of claim 8.

18. A non-transitory computer-readable storage medium, comprising stored programs, wherein the programs, when executed by a processor, perform the method of claim 1.

19. A non-transitory computer-readable storage medium, comprising stored programs, wherein the programs, when executed by a processor, perform the method of claim 5.

20. A non-transitory computer-readable storage medium, comprising stored programs, wherein the programs, when executed by a processor, perform the method of claim 8.

* * * * *